US012748704B2

(12) United States Patent
Daily et al.

(10) Patent No.: US 12,748,704 B2
(45) Date of Patent: Sep. 29, 2026

(54) SYSTEM, METHOD, AND APPARATUS FOR PROVIDING AN ADAPTIVE MEMORY ARCHITECTURE FOR AN ARTIFICIAL INTELLIGENCE ENVIRONMENT

(71) Applicant: BitForge Dynamics LLC, Monroe, LA (US)

(72) Inventors: Brock Daily, Alma, AR (US); Daniel Rubinov, Brooklyn, NY (US)

(73) Assignee: BitForge Dynamics LLC

( * ) Notice: Subject to any disclaimer, the term of this patent is extended or adjusted under 35 U.S.C. 154(b) by 8 days.

(21) Appl. No.: 18/798,443

(22) Filed: Aug. 8, 2024

(65) Prior Publication Data

US 2025/0053517 A1 Feb. 13, 2025

Related U.S. Application Data

(60) Provisional application No. 63/531,475, filed on Aug. 8, 2023.

(51) Int. Cl.

| | |
|---|---|
| ***G06F 12/08*** | (2016.01) |
| ***G06F 9/50*** | (2006.01) |
| ***G06F 12/0893*** | (2016.01) |

(52) U.S. Cl.

CPC ........ *G06F 12/0893* (2013.01); *G06F 9/5016* (2013.01)

(58) Field of Classification Search

CPC ............. G06F 12/0893; G06F 12/0875; G06F 12/0897; G06F 12/0811; G06F 9/5016; G06F 9/5066; G06F 9/541; G06F 2212/1024; G06F 2209/5021; G06F 2209/85017; G06N 20/00; G06N 3/044

See application file for complete search history.

(56) References Cited

U.S. PATENT DOCUMENTS

| | | | | |
|---|---|---|---|---|
| 11,861,204 | B2 * | 1/2024 | Cui | G06F 3/067 |
| 2016/0321176 | A1 * | 11/2016 | Yoo | G06F 12/0811 |
| 2018/0024932 | A1 * | 1/2018 | Nachimuthu | G06F 3/0653 |
| 2019/0253520 | A1 * | 8/2019 | Maharana | G06N 3/092 |
| 2021/0014324 | A1 * | 1/2021 | Chilikin | G06F 1/324 |

(Continued)

FOREIGN PATENT DOCUMENTS

CN 118277305 A * 12/2022

*Primary Examiner* — Tracy C Chan

(74) *Attorney, Agent, or Firm* — DITTHAVONG, STEINER & MLOTKOWSKI

(57) ABSTRACT

An approach is provided for an adaptive memory architecture for an artificial intelligence (AI) environment. The approach involves, for example, configuring a first memory component configured as a first-level (L1) memory cache equivalent to store first data that is transient. The approach also involves configuring a second memory component as a second-level (L2) memory cache equivalent to store second data that is not held within the in-memory data store and is accessed at greater than an L2 frequency threshold. The approach further involves configuring a third memory component as a third-level (L3) memory cache equivalent to store third data that is accessed at less than the L2 frequency threshold and at greater than an L3 frequency threshold. The approach further involves configuring a fourth memory component as a fourth-level (L4) memory cache equivalent to store fourth data that is accessed at less than the L3 frequency threshold.

17 Claims, 14 Drawing Sheets

(56) References Cited

U.S. PATENT DOCUMENTS

| | | | | |
|---|---|---|---|---|
| 2023/0418747 | A1* | 12/2023 | Arora | G06F 12/0811 |
| 2024/0095077 | A1* | 3/2024 | Singh | G06F 9/5027 |
| 2024/0427696 | A1* | 12/2024 | Vishnuswaroop Ramesh | G06F 12/0238 |
| 2025/0259042 | A1* | 8/2025 | Crabtree | G06N 3/047 |

* cited by examiner

100

400 (CONT.)

SYSTEM, METHOD, AND APPARATUS FOR PROVIDING AN ADAPTIVE MEMORY ARCHITECTURE FOR AN ARTIFICIAL INTELLIGENCE ENVIRONMENT

CROSS-REFERENCE TO RELATED APPLICATIONS

This application claims priority to and the benefit of the U.S. Provisional application No. 63/531,475 filed Aug. 8, 2023, and the content of which is incorporated by reference in its entirety.

FIELD OF THE INVENTION

The present invention relates generally to the field of data storage and management in artificial intelligence (AI)-driven computing environments. More specifically, it pertains to the development and implementation of systems that enable efficient and reliable data access, retrieval, and processing for various AI applications, such as natural language understanding, computer vision, machine learning, and decision making (e.g., within video games, simulations, virtual environments, and other interactive media platforms.).

Some Example Embodiments

There is a need for an approach for providing an adaptive memory architecture for an artificial intelligence (AI) environment, with one example (but not exclusive) AI environment relating to interactive experiences with non-player characters (NPCs) in video games and/or equivalent experiences.

According to one embodiment, a system for data storage in an artificial intelligence (AI) computing environment comprises a first memory component configured as a first-level (L1) memory cache equivalent to store first data that is transient. The system also comprises a second memory component configured as a second-level (L2) memory cache equivalent to store second data that is not held within the in-memory data store and is accessed at greater than an L2 frequency threshold. The system further comprises a third memory component configured as a third-level (L3) memory cache equivalent to store third data that is accessed at less than the L2 frequency threshold and at greater than an L3 frequency threshold. The system further comprises a fourth memory component configured as a fourth-level (L4) memory cache equivalent to store fourth data that is accessed at less than the L3 frequency threshold.

According to another embodiment, a method for data storage in an artificial intelligence (AI) computing environment comprises configuring a first memory component configured as a first-level (L1) memory cache equivalent to store first data that is transient. The method also comprises configuring a second memory component as a second-level (L2) memory cache equivalent to store second data that is not held within the in-memory data store and is accessed at greater than an L2 frequency threshold. The method further comprises configuring a third memory component as a third-level (L3) memory cache equivalent to store third data that is accessed at less than the L2 frequency threshold and at greater than an L3 frequency threshold. The method further comprises configuring a fourth memory component as a fourth-level (L4) memory cache equivalent to store fourth data that is accessed at less than the L3 frequency threshold.

An apparatus for data storage in an artificial intelligence (AI) computing environment comprises at least one processor, and at least one memory including computer program code, the at least one memory and the computer program code configured to, with the at least one processor, cause the apparatus to configure a first memory component configured as a first-level (L1) memory cache equivalent to store first data that is transient. The apparatus is also caused to configure a second memory component as a second-level (L2) memory cache equivalent to store second data that is not held within the in-memory data store and is accessed at greater than an L2 frequency threshold. The apparatus is further caused to configure a third memory component as a third-level (L3) memory cache equivalent to store third data that is accessed at less than the L2 frequency threshold and at greater than an L3 frequency threshold. The apparatus is further caused to configure a fourth memory component as a fourth-level (L4) memory cache equivalent to store fourth data that is accessed at less than the L3 frequency threshold.

According to another embodiment, a computer-readable storage medium for managing NPC engagement in video game environments (or any other computer-generated environment) carrying one or more sequences of one or more instructions which, when executed by one or more processors, cause an apparatus to configure a first memory component configured as a first-level (L1) memory cache equivalent to store first data that is transient. The apparatus is also caused to configure a second memory component as a second-level (L2) memory cache equivalent to store second data that is not held within the in-memory data store and is accessed at greater than an L2 frequency threshold. The apparatus is further caused to configure a third memory component as a third-level (L3) memory cache equivalent to store third data that is accessed at less than the L2 frequency threshold and at greater than an L3 frequency threshold. The apparatus is further caused to configure a fourth memory component as a fourth-level (L4) memory cache equivalent to store fourth data that is accessed at less than the L3 frequency threshold.

According to another embodiment, an apparatus for data storage in an artificial intelligence (AI) computing environment comprises means for configuring a first memory component configured as a first-level (L1) memory cache equivalent to store first data that is transient. The apparatus also comprises means for configuring a second memory component as a second-level (L2) memory cache equivalent to store second data that is not held within the in-memory data store and is accessed at greater than an L2 frequency threshold. The apparatus further comprises means for configuring a third memory component as a third-level (L3) memory cache equivalent to store third data that is accessed at less than the L2 frequency threshold and at greater than an L3 frequency threshold. The apparatus further comprises means for configuring a fourth memory component as a fourth-level (L4) memory cache equivalent to store fourth data that is accessed at less than the L3 frequency threshold.

According to another embodiment, a method for managing non-player character (NPC) engagement in video game environments (or any other computer-generated environment) comprises receiving diverse data types. The method also comprises converting said data types to string-based representations. The method further comprises processing string input through a Large Language Model (LLM) subsystems (also referred to herein as Local Learning Modules) to produce an NPC response. The method further comprises presenting the NPC response via immersive multimedia formats.

According to another embodiment, an apparatus for managing NPC engagement in video game environments (or any other computer-generated environment) comprises at least one processor, and at least one memory including computer program code, the at least one memory and the computer program code configured to, with the at least one processor, cause the apparatus to receive diverse data types. The apparatus is also caused to convert said data types to string-based representations. The apparatus is further caused to process string input through LLM subsystems to produce an NPC response. The apparatus is further caused to present the NPC response via immersive multimedia formats.

According to another embodiment, a computer-readable storage medium for managing NPC engagement in video game environments (or any other computer-generated environment) carrying one or more sequences of one or more instructions which, when executed by one or more processors, cause an apparatus to receive diverse data types. The apparatus is also caused to convert said data types to string-based representations. The apparatus is further caused to process string input through LLM subsystems to produce an NPC response. The apparatus is further caused to present the NPC response via immersive multimedia formats.

According to another embodiment, an apparatus for managing NPC engagement in video game environments (or any other computer-generated environment) comprises means for receiving diverse data types. The apparatus also comprises means for converting said data types to string-based representations. The apparatus further comprises means for processing string input through LLM subsystems to produce an NPC response. The apparatus further comprises means for presenting the NPC response via immersive multimedia formats.

According to another embodiment, a system for an Adaptive Semantic Interaction System (ASIS) for video game environments comprises data acquisition means or circuitry for collecting diverse types of data. The system also comprises initial processing means or circuitry for converting said data into string format. The system further comprises Large Language Model (LLM) subsystems or circuitry for evaluating and generating NPC responses. The system further comprises response rendering means or circuitry to deliver NPC responses through immersive techniques such as Text-to-Speech (TTS), animations, and sound effects.

According to one embodiment, a method for adaptive data organization in an Artificial Intelligence (AI)-driven environment comprises storing data in a transient LLM cache for rapid retrieval. The method also comprises organizing frequently used data in in-memory storage. The method further comprises archiving long-term data in structured-traditional databases. The method further comprises maintaining data relationships within vector databases for semantic and contextual searches.

According to another embodiment, an apparatus for adaptive data organization in an Artificial Intelligence (AI)-driven environment comprising at least one processor, and at least one memory including computer program code, the at least one memory and the computer program code configured to, with the at least one processor, cause the apparatus to store data in a transient LLM cache for rapid retrieval. The apparatus is also caused to organize frequently used data in in-memory storage. The apparatus is further caused to archive long-term data in structured-traditional databases. The apparatus is further caused to maintain data relationships within vector databases for semantic and contextual searches.

According to another embodiment, a computer-readable storage medium for adaptive data organization in an Artificial Intelligence (AI)-driven environment carrying one or more sequences of one or more instructions which, when executed by one or more processors, cause an apparatus to store data in a transient LLM cache for rapid retrieval. The apparatus is also caused to organize frequently used data in in-memory storage. The apparatus is further caused to archive long-term data in structured-traditional databases. The apparatus is further caused to maintain data relationships within vector databases for semantic and contextual searches.

According to another embodiment, an apparatus for adaptive data organization in an Artificial Intelligence (AI)-driven environment comprises means for storing data in a transient LLM cache for rapid retrieval. The apparatus also comprises means for organizing frequently used data in in-memory storage. The apparatus further comprises means for archiving long-term data in structured-traditional databases. The method further comprises means for maintaining data relationships within vector databases for semantic and contextual searches.

An immersive dialogue loop system for AI-driven NPC interactions comprising means or circuitry to decide on immediate response or extended contextual evaluation. The system also comprises tools or circuitry to provide immersive 'distractions' during decision delays. The system further comprises systems or circuitry to ensure the AI or NPC retains consistent character presentation throughout interactions.

According to one embodiment, a method for processing diverse incoming data in an AI-driven environment comprises identifying the inherent nature of the data. The method also comprises decomposing audio, video, or image-based data into contextual strings. The method further comprises preparing the resultant string for further AI subsystem processing.

According to another embodiment, an apparatus for processing diverse incoming data in an AI-driven environment comprising at least one processor, and at least one memory including computer program code, the at least one memory and the computer program code configured to, with the at least one processor, cause the apparatus to process diverse incoming data in an AI-driven environment comprises identifying the inherent nature of the data. The apparatus is also caused to decompose audio, video, or image-based data into contextual strings. The apparatus is further caused to prepare the resultant string for further AI subsystem processing.

According to another embodiment, a computer-readable storage medium for processing diverse incoming data in an AI-driven environment carrying one or more sequences of one or more instructions which, when executed by one or more processors, cause an apparatus to process diverse incoming data in an AI-driven environment comprises identifying the inherent nature of the data. The apparatus is also caused to decompose audio, video, or image-based data into contextual strings. The apparatus is further caused to prepare the resultant string for further AI subsystem processing.

According to another embodiment, an apparatus for processing diverse incoming data in an AI-driven environment comprises means for processing diverse incoming data in an AI-driven environment comprises identifying the inherent nature of the data. The apparatus also comprises means for decomposing audio, video, or image-based data into contextual strings. The apparatus further comprises means for preparing the resultant string for further AI subsystem processing.

A system for optimizing string-based NPC interactions in video game environments (or any other computer-generated environment) comprises tools or circuitry to enrich string inputs with contextual data from caches. The system also comprises Subsystems (Alpha, Beta, and Omega LLM) or circuitry to assess and refine NPC responses. The system further comprises delimiters and string parsing methods or circuitry to streamline system efficiency.

According to one embodiment, a method for ensuring immersive AI and NPC engagements in real-time video game settings or any other setting comprises initiating immersive experiences during AI processing delays. The method also comprises crafting responses based on semantic searches within vector databases. The method further comprises integrating discovered semantic nuances into finalized NPC interactions.

According to another embodiment, an apparatus for ensuring immersive AI and NPC engagements in real-time video game settings or any other setting comprising at least one processor, and at least one memory including computer program code, the at least one memory and the computer program code configured to, with the at least one processor, cause the apparatus to initiate immersive experiences during AI processing delays. The apparatus is also caused to craft responses based on semantic searches within vector databases. The apparatus is further caused to integrate discovered semantic nuances into finalized NPC interactions.

According to another embodiment, a computer-readable storage medium for ensuring immersive AI and NPC engagements in real-time video game settings or any other setting carrying one or more sequences of one or more instructions which, when executed by one or more processors, cause an apparatus to initiate immersive experiences during AI processing delays. The apparatus is also caused to craft responses based on semantic searches within vector databases. The apparatus is further caused to integrate discovered semantic nuances into finalized NPC interactions.

According to another embodiment, an apparatus for ensuring immersive AI and NPC engagements in real-time video game settings or any other setting comprises means for initiating immersive experiences during AI processing delays. The apparatus also comprises means for crafting responses based on semantic searches within vector databases. The apparatus further comprises means for integrating discovered semantic nuances into finalized NPC interactions.

According to another embodiment, a system for managing long-term and short-term data in an AI-driven environment comprises L2 cache or circuitry for storing short-lived context elements. The system also comprises L3 data storage or circuitry resembling databases for persistent data. The system further comprises L4 vector database or circuitry for deep semantic exploration and AI interactions.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF PREFERRED EMBODIMENT

Figure 1:
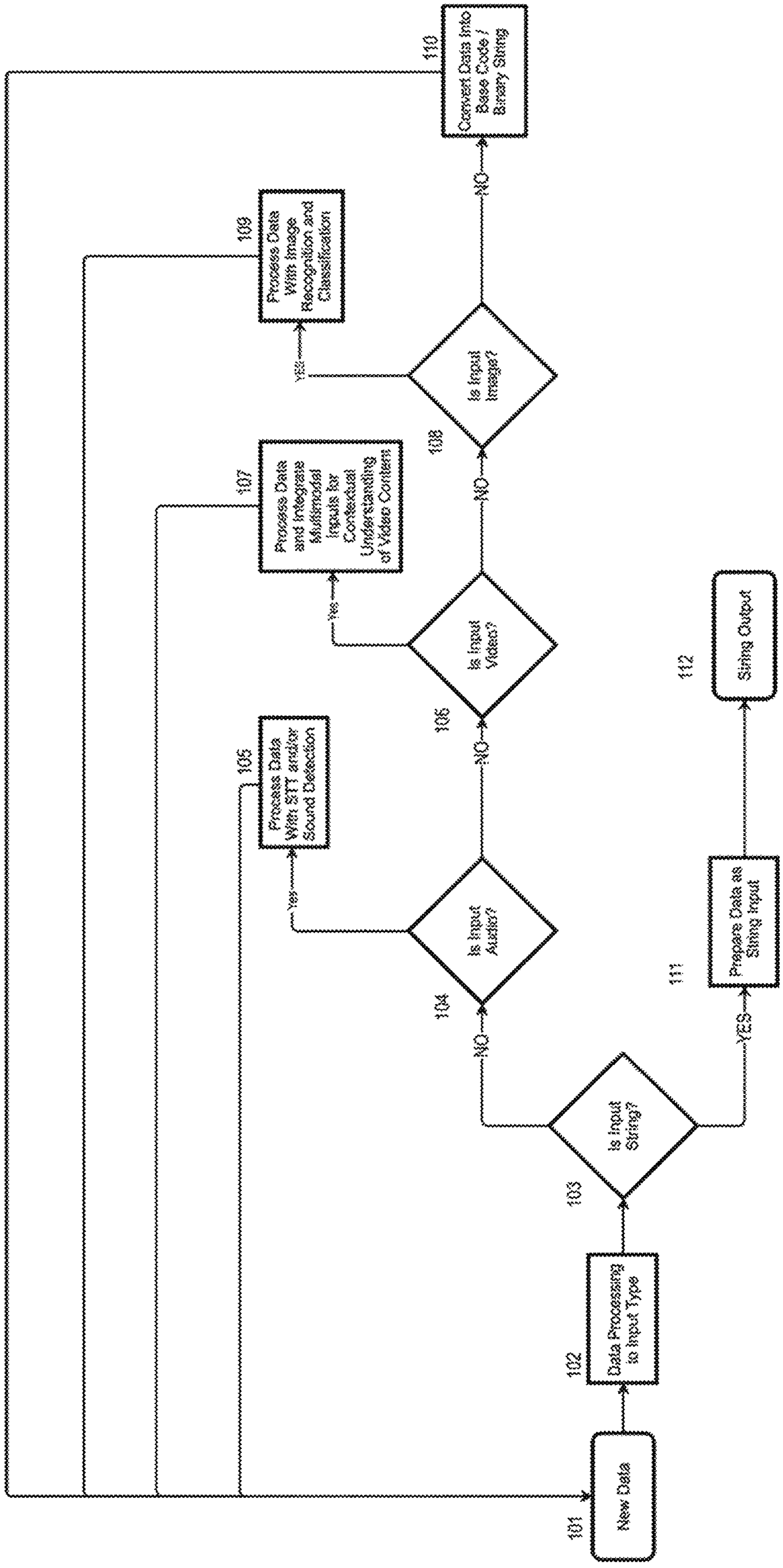
FIG. 1 is a diagram of a string output flowchart for diverse data inputs, according to one embodiment.
Figure 2A:
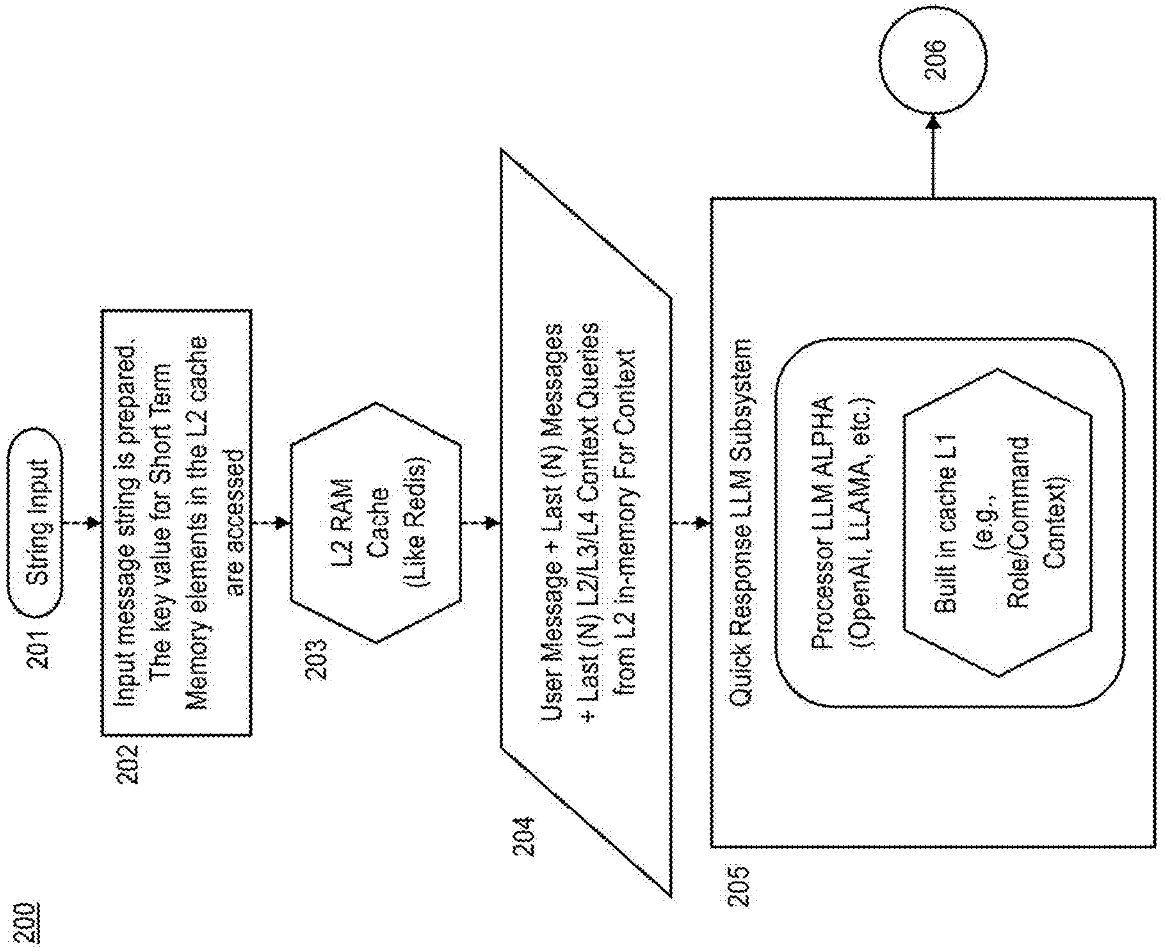
FIGS. 2A-2G are diagrams of a flowchart of the LLM subsystems in string input processing, according to one embodiment.
Figure 2B:
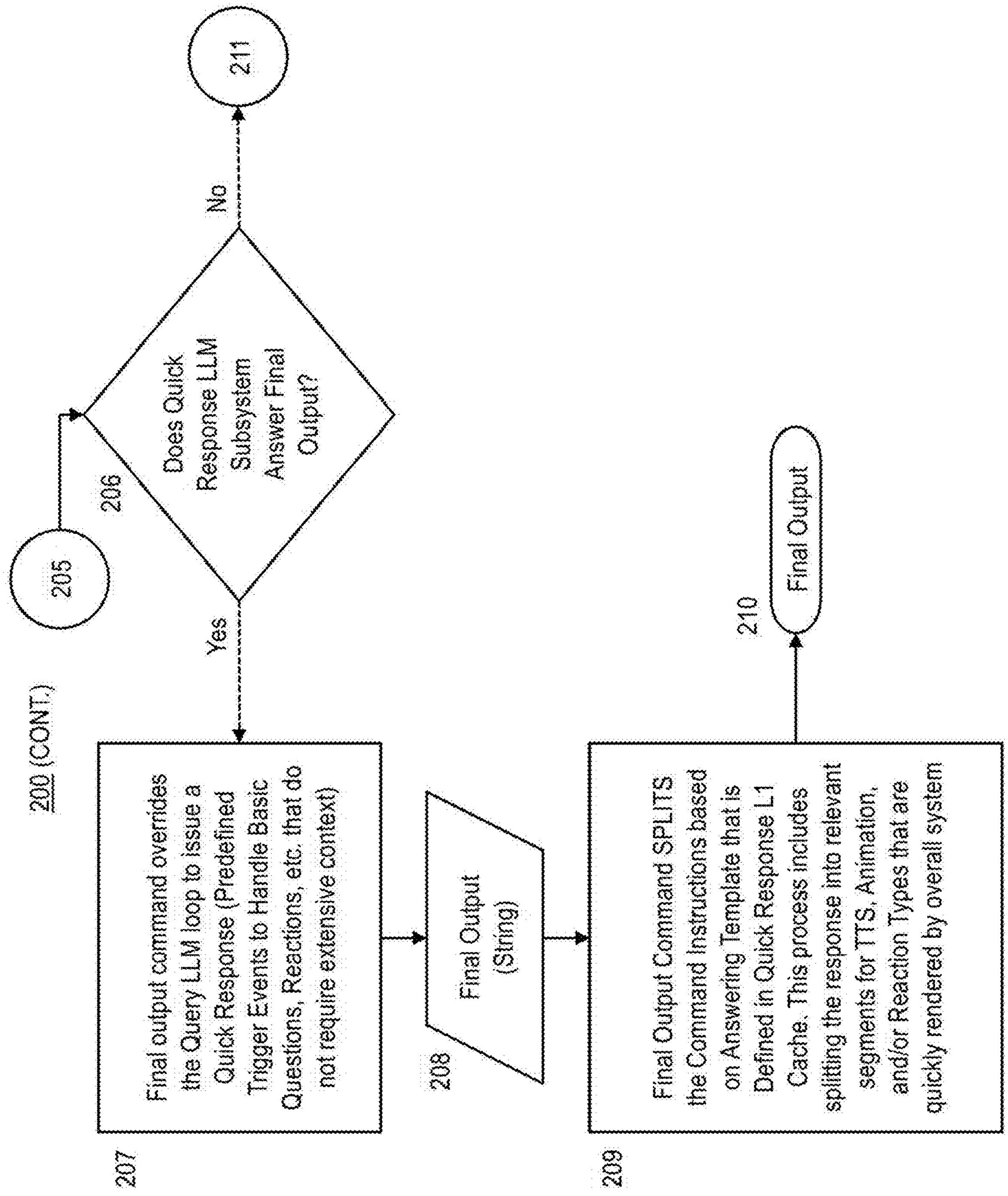
Figure 2C:
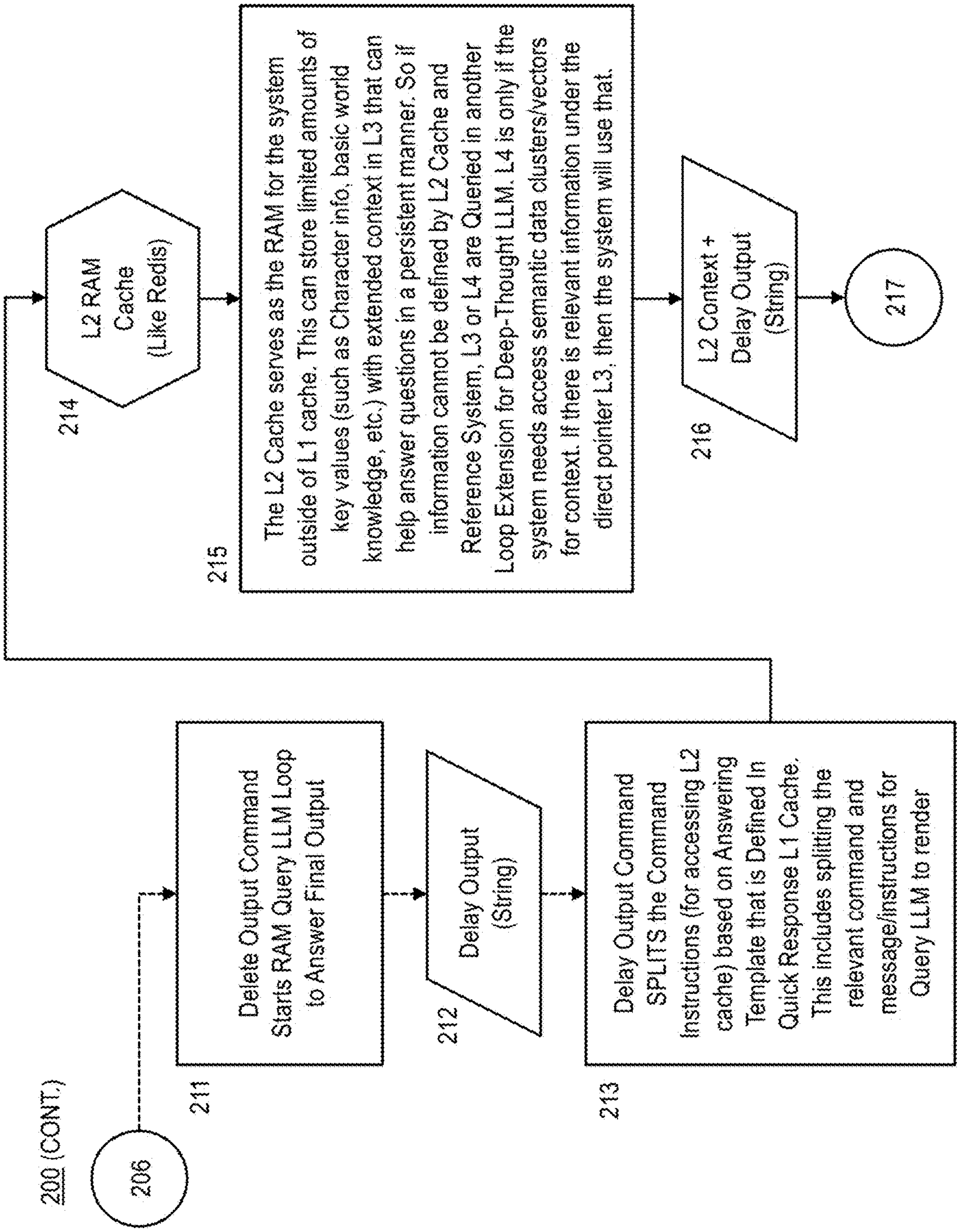
Figure 2D:
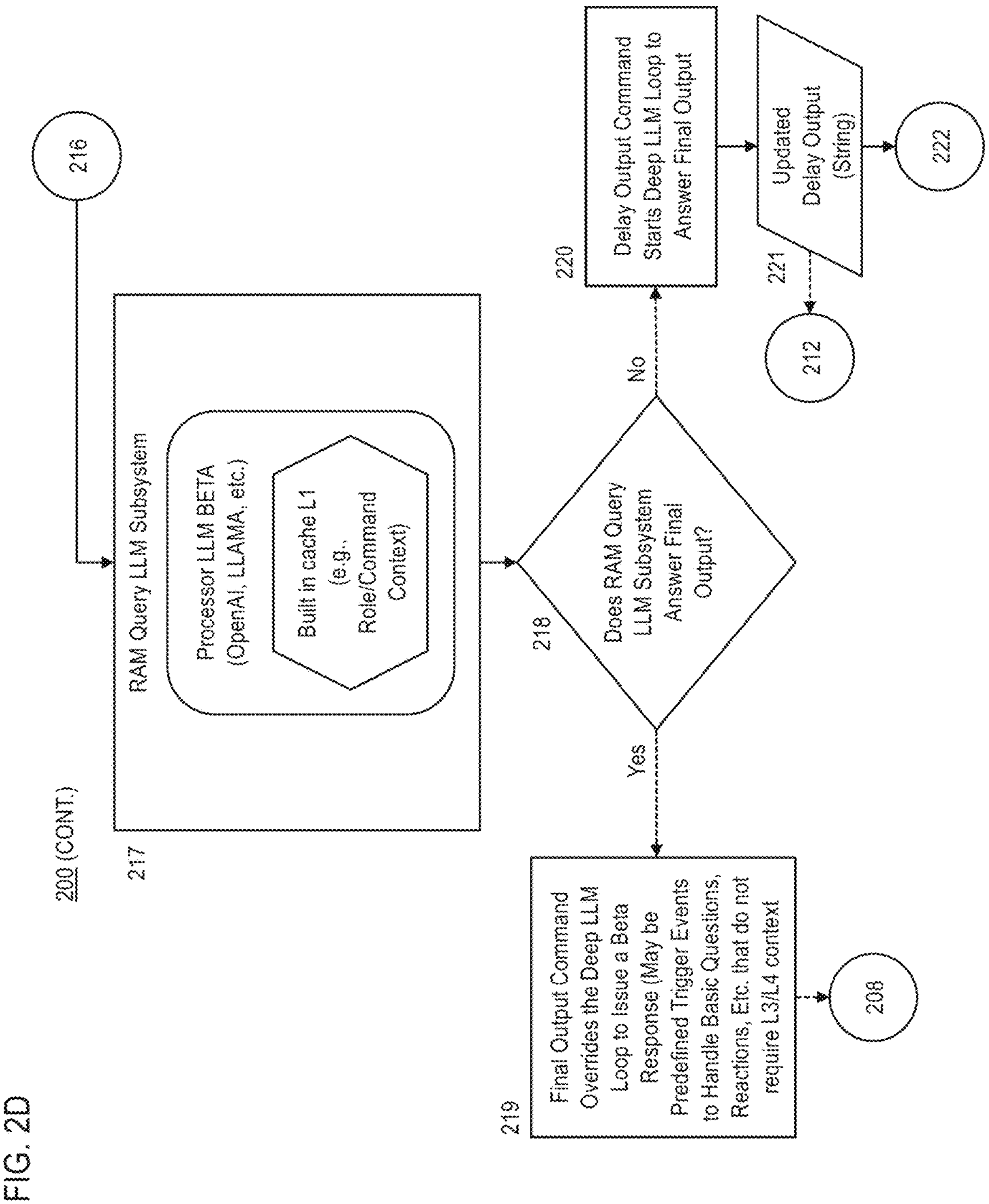
Figure 2E:
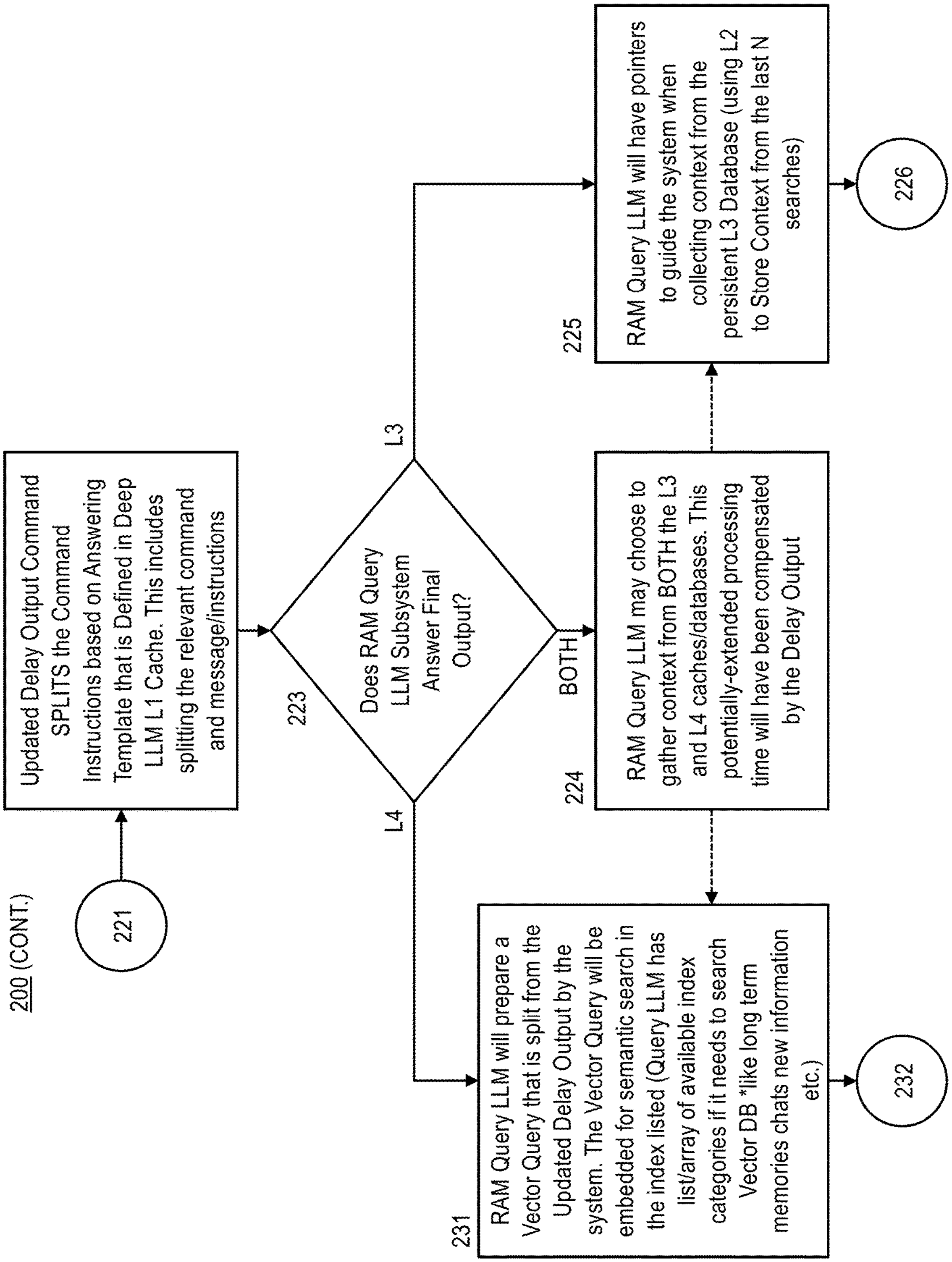
Figure 2F:
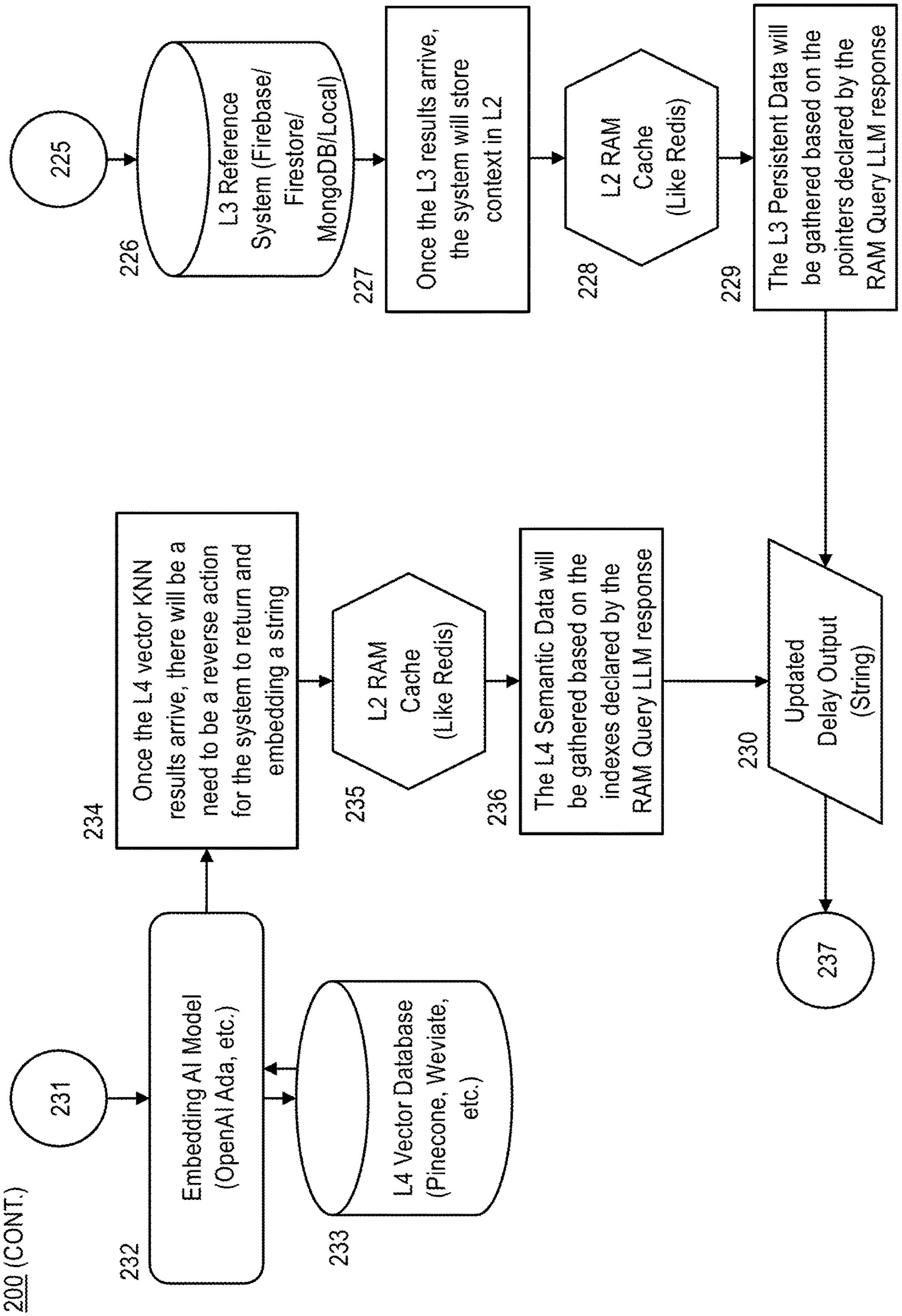
Figure 2G:
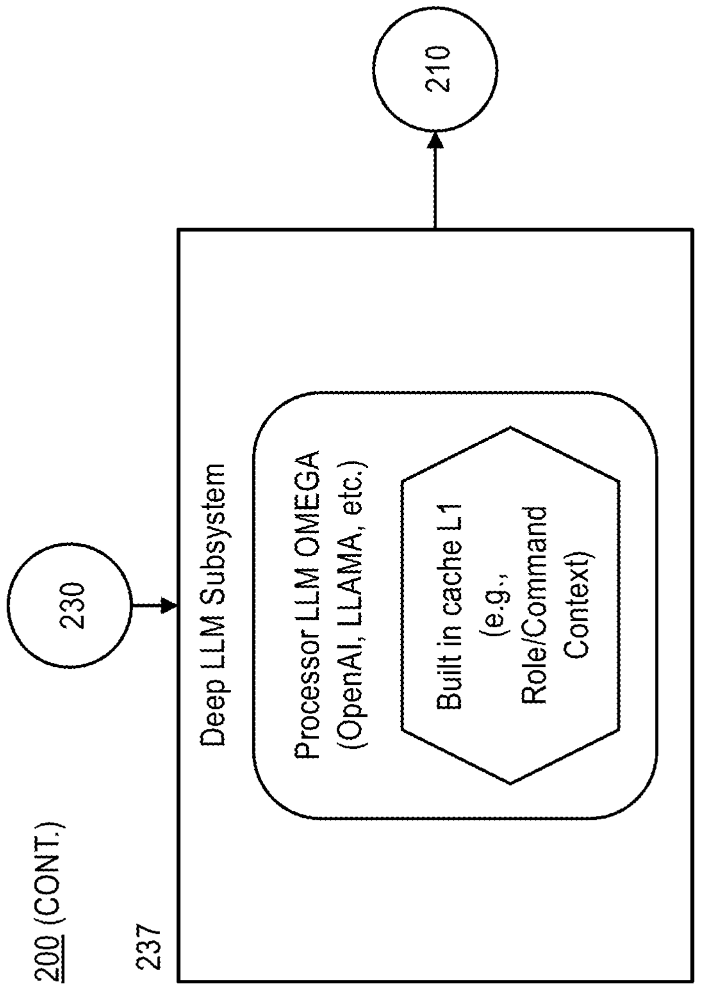

Methods, systems, and apparatuses for providing an adaptive memory architecture for an artificial intelligence (AI) environment and for providing an adaptive semantic interaction system (ASIS) for contextual non-player character (NPC) engagement and content management in video game environments are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. In addition, the embodiments described herein are provided by example, and as such, "one embodiment" can also be used synonymously as "one example embodiment." Further, the terms "a" and "an" herein do not denote a limitation of quantity, but rather denote the presence of at least one of the referenced items. Moreover, various features are described which may be exhibited by some embodiments and not by others. Similarly, various requirements are described which may be requirements for some embodiments but not for other embodiments.

Additionally, as used herein, the term 'circuitry' may refer to (a) hardware-only circuit implementations (for example, implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular device, other network device, and/or other computing device.

The various embodiments of an Adaptive Semantic Interaction System (ASIS) described herein introduce a groundbreaking architecture designed to revolutionize Non-Player Character (NPC) engagement and content management in video game landscapes. More than just a dialogue system, ASIS functions as an expansive network capable of managing multiple LLMs (Large Language Model) in an intricate context loop, optimizing interactions in real-time based on player inputs and prior context, while also providing an adaptive memory/data storage architecture for AI environments in general.

With respect to AI facilitated interactions, by synthesizing diverse data sources—from text to audio to visual multimedia—ASIS transforms raw data into context-enriched strings. These strings are then intelligently channeled through a hierarchy of LLM subsystems, ensuring swift responses while maintaining the option for deep dives into vast wells of contextual information stored across tiered data storage systems, from caches to state-of-the-art vector databases.

In one embodiment, the hierarchy of LLM subsystems in ASIS is arranged in a data storage architecture that uses the cache memory architecture comprising, e.g., four levels (or equivalent numbers of levels) of cache memory equivalents: L1, L2, L3, and L4, each with different capacities, speeds, and functions.

The L1 cache is the fastest and smallest level, where the most relevant and frequently accessed data is stored. This includes the current context of the interaction, such as the player's dialogue choices, actions, emotions, and preferences, as well as the NPC's personality, goals, and attitude. The L1 cache enables ASIS to generate immediate and coherent responses that match the current state of the engagement.

The L2 cache is the second-fastest and second-smallest level, where the less relevant but still important data is stored. This includes the recent history of the interaction, such as the previous dialogue topics, outcomes, and consequences, as well as the NPC's memory, knowledge, and beliefs. The L2 cache enables ASIS to access and update the data that influences the NPC's behavior and decision-making, as well as to generate responses that reflect the continuity and progression of the interaction.

The L3 cache is the third-fastest and third-smallest level, where the general and global data is stored. This includes the background information of the interaction, such as the setting, plot, and theme of the game, as well as the NPC's role, relationships, and motivations. The L3 cache enables ASIS to access and update the data that shapes the NPC's character and worldview, as well as to generate responses that align with the overall narrative and logic of the game.

The L4 cache is the slowest and largest level, where the vast and diverse data is stored. This includes the external and auxiliary data sources, such as text, audio, visual, and multimedia data from the game or the internet, as well as the NPC's interests, hobbies, and trivia. The L4 cache enables ASIS to access and update the data that enriches the NPC's personality and dialogue, as well as to generate responses that surprise and delight the player with novel and relevant content.

By utilizing this hierarchical data storage architecture, ASIS can optimize the performance and quality of the LLM subsystems, ensuring swift responses while maintaining the option for deep dives into vast wells of contextual information. It is noted that although the various embodiments described herein are discussed with respect to using a novel memory architecture for interactive gaming experiences, it is contemplated that the same architecture is applicable to general computing, operating systems, and/or any other AI-driven computing environment. Accordingly, where gaming specific terminology is used, it is contemplated that equivalent general computing or operating system terms can be equivalently used.

In one embodiment, a notable feature of ASIS is its capability to manage and scale numerous LLMs in a centralized context loop, allowing for the simultaneous processing of varied data streams. This scalability ensures a dynamic, multi-layered engagement, where NPCs can adjust and respond to player inputs with a level of depth and nuance previously unattained.

Moreover, to bolster immersion, ASIS seamlessly integrates immersive experiences, using tools like 3D animations and dynamic audio sequences to bridge any processing delays, making every AI or NPC interaction feel real and uninterrupted.

In the modern era of AI-driven computing such as but not limited to video gaming, NPCs have evolved from simple scripted entities to complex characters with predefined behaviors and dialogues. While advancements have been made in graphics, gameplay mechanics, and storytelling, the interaction with NPCs often remains limited, lacking depth, contextual awareness, and responsiveness.

Traditional systems for NPC interaction predominantly rely on predefined dialogue trees, limited context awareness, and static reactions to player actions. These conventional approaches can result in repetitive and predictable interactions, leading to a loss of immersion and engagement for the player.

Technical limitations of conventional approaches and corresponding technical challenges/problems include but are not limited to the following. For example, there can be a limitation in contextual awareness. NPCs typically respond based on a limited set of predefined cues without considering the broader game context or the specific actions and history of the player. This leads to generic and often incongruent responses. In other words, a limitation in contextual awareness is the inability of NPCs to take into account the broader game context or the specific actions and history of the player when responding. This means that NPCs can only react based on a limited set of predefined cues, such as keywords, locations, or events, without considering how they relate to the overall game state or the player's choices and preferences. This can result in generic and often incongruent responses that do not match the situation or the player's expectations. For example, an NPC might greet the player with the same dialogue every time they meet, regardless of whether the player has helped or harmed them before, or whether the game world is in a state of peace or war. A limitation in contextual awareness can reduce the realism and immersion of NPC interactions and make them less engaging and satisfying for the player.

Another technical challenge relates to lack of accurate, efficient, dynamic content generation. For example, conventional systems struggle to generate content such as dialogues and reactions dynamically, relying heavily on scripted content. This limits the replay value and adaptability of games to different scenarios and player choices. Attempts that use LLMs to facilitate dynamic dialogue are often plagued by long generation times and broken reactions that disrupt immersive AI conversations.

Another technical challenge relates to real-time responsiveness. For example, real-time responsiveness and adaptation to player actions are often constrained by technological limitations. Achieving a seamless and instantaneous reaction to events without impacting performance is a complex challenge.

Another technical challenge relates to limited scalability and customization. Traditional approaches struggle to adapt to various game genres, languages, character archetypes, or individual player needs. This lack of flexibility hinders innovation and inclusivity in game design.

Yet another technical challenge relates to performance optimization concerns. Handling large-scale data and complex real-time queries without affecting the gaming performance requires sophisticated optimization, which traditional systems often fail to achieve.

To address these technical challenges, the various embodiments described herein consider and provide technical solutions to problems such as but not limited to scalability, adaptation, performance optimization, accessibility, and dynamic content management, aiming to redefine data storage paradigms can be leveraged to increase responsiveness and performance of AI environments, such as but not limited to the way NPCs are integrated and interacted with in various interactive environments.

In one embodiment, the various embodiments described herein embody a visionary leap in AI-driven data storage architecture for use in AI-drive computing environments including but not limited to the domain of video games, simulations, and interactive media. It integrates cutting-edge technologies and novel methods to redefine the experience of interacting with Non-Playable Characters (NPCs) (e.g., processing diverse data types into different memory architectures that provide timely and efficient contextual data for AI-based character interaction and/or any other type of AI-based functionality).

The various embodiments described herein provide for components to provide dynamic contextual awareness of AI interactions. These components include but are not limited to a vector databases context-dependent responses. For example, with respect to vector databases, the various embodiments described herein leverage intricate vector database structures with multiple indexes, storing vast amounts of semantic world knowledge, character logs, conversations, events, objects, and more. This data-driven approach enables unparalleled contextual understanding. Vector database with multiple indexes provide technical advantages such as but not limited to: (1) faster and more accurate retrieval of relevant data for AI-driven interactions, as the system can query multiple dimensions of the data based on the current context, such as location, time, topic, emotion, etc.; (2) more natural and coherent generation of NPC dialogues and actions, as the system can access and use the semantic relationships and associations between different data elements, such as concepts, events, characters, etc.; (3) more adaptive and dynamic AI behavior, as the system can update and modify the data based on the changes in the world state and the player actions, creating new possibilities and outcomes for each interaction; and (4) more efficient and scalable data storage, as the system can compress and organize the data into compact vector representations that preserve the semantic information and reduce redundancy and noise.

With respect to context-dependent responses, NPCs, powered by the system, react and respond based on the unique history, actions, and context of the player. This individualized interaction heightens immersion and realism. This individualized and contextualized interaction heightens immersion and realism. Context-dependent responses enable NPCs to: (1) tailor their dialogue and behavior to the player's personality, preferences, and choices, creating a more personalized and engaging experience; (2) adapt to the changing world state and events, such as environmental conditions, time of day, quests completed, etc., making the world more dynamic and responsive; (3) express emotions and attitudes that are appropriate and consistent with the situation, such as fear, anger, gratitude, etc., enhancing the emotional impact and realism of the interaction; (4) provide relevant and useful information and feedback to the player, such as hints, tips, directions, opinions, etc., depending on the current context and goals; and (5) initiate and participate in context-sensitive interactions with other NPCs, such as conversations, fights, trades, etc., enriching the social and cultural aspects of the world.

In one embodiment, the system further includes components for real-time interaction and responsiveness. For example, the components can include or otherwise facility event-driven conversations. More specifically, the various embodiments described herein implement real-time event-based mechanisms, allowing NPCs to reflect the current state of the world and player actions immediately, shifting conversational dynamics instantaneously.

In one embodiment, the system includes one or more Large Language Model (LLM) subsystems. Integrating state-of-the-art LLMs facilitates natural language generation that is character-consistent and lore-accurate. This synergy between linguistics and AI technology provides human-like conversation.

In one embodiment, the system provides Content Management and Procedural Generation. With respect to Dynamic Content Creation, the various embodiments described herein introduce mechanisms for procedural dialogue and narrative creation, enabling content that evolves with gameplay and/or any other equivalent AI interaction. This breakthrough allows continuous freshness and adaptability in AI output (e.g., storytelling in a video game context). In addition, the system provides Scalable World Events. For example, the system can trigger and manage complex world events dynamically, accounting for individual player behavior and global game states (e.g., via contextual information stored according to various embodiments of the data storage architecture described herein).

The various embodiment described herein also enable Scalable and Customizable Design across a range of AI interactions. Accordingly, the system can provide Cross-Genre Adaptation. The system' 2 modular nature permits integration across various game genres, themes, and platforms, making it an all-encompassing solution for diverse gaming experiences. In addition, the system can provide Personalized Interaction by tailoring NPC interaction (or any other AI interaction) to suit individual player preferences and profiles. This, in turn, ensures a customized and inclusive experience.

In one embodiment, the system include components for Performance Optimization. For example, the components can provide for Optimized Data Handling. More specifically, the various embodiments described herein employ cutting-edge algorithms to optimize real-time queries and large-scale data handling. It ensures robust performance even in the most demanding gaming scenarios. The system also provides Streamlined Integration. In other words, the system is designed for seamless integration with existing game engines and frameworks, allowing developers to unlock its potential without compromising performance.

They system is further based on Inclusive and Accessible Design to provide Universal Accessibility. For example, the system's design emphasizes broad access and engagement, including considerations for various languages, abilities, and age groups.

The various embodiments described herein are further based on various Legal and Ethical Considerations. In particular, the system is directed to providing Compliance and Responsibility. The various embodiments described herein incorporate mechanisms to ensure compliance with legal standards and promotes ethical interaction. This also includes the ability to list 'restricted topics' and other content the AI NPC or other interaction system should avoid discussing (depending on the game audience).

In summary, the various embodiments described herein represent a monumental stride in interactive entertainment, synthesizing technological innovation, dynamic adaptability, inclusivity, and ethical considerations. By converging these elements, the system not only transcends the existing boundaries of NPC interaction (or AI interaction in general) but also sets the stage for a new era of immersive, engaging, and personalized AI experiences.

The various embodiments described herein represent a novel approach to implement a data storage architecture to support an AI computing environment (e.g., to provide NPC interaction within video games, simulations, and interactive platforms) with the integration of multiple technological domains, each with intricate mechanisms and functionalities to enhance memory efficiency and reduce latency.

In one embodiment, the architecture of the system (e.g., the Adaptive Semantic Interaction System) forms the backbone of its functionality, allowing for seamless, real-time, and contextual AI interactions (e.g., interactions between players and NPCs). Every subsystem is meticulously crafted to contribute to the overall immersion and adaptability of the AI-driven computing experience.

The architecture, for instance, comprises a Central Processing system. More specifically, the central processing system behind ASIS's cognitive architecture serves as a manager and orchestrator for the entire system. By way of example, a manager and orchestrator of the entire system is a component that coordinates and controls the activities of all the subsystems, ensuring coherence and consistency of the overall system's behavior. A manager and orchestrator of the entire system has the following roles: (1) it sets the goals and objectives of the system based on the user input and the game context; (2) it monitors the status and performance of each subsystem, detecting and resolving any conflicts or errors that may arise; (3) it communicates and synchronizes with other external systems, such as the game engine, the graphics, and the sound modules; and (4) it adapts and learns from the feedback and outcomes of the system's actions, improving its efficiency and effectiveness over time.

In one embodiment, the core framework comprises a task scheduler, data directives, error handling module, load balance, and/or any other equivalent component. For example, the Task Scheduler is responsible for prioritizing and allocating tasks to specific LLMs (or any equivalent AI/ML subsystem) based on real-time requirements and past performance metrics. The Task Scheduler is a component that dynamically assigns tasks to the appropriate subsystems based on their priority, urgency, and availability. For example, the Task Scheduler can delegate high-priority tasks, such as responding to user commands or generating realistic animations, to the most suitable LLMs, while deferring low-priority tasks, such as updating background details or performing routine maintenance, to less busy or idle LLMs. The Task Scheduler can also adjust the task allocation according to the real-time requirements of the system, such as the current game state, the user preferences, or the environmental conditions. Additionally, the Task Scheduler can use past performance metrics, such as the accuracy, speed, or quality of each subsystem, to optimize the task distribution and improve the overall system efficiency and effectiveness.

Data Directives oversee the flow of data, ensuring efficient routing between subsystems and optimizing memory usage. By way of example, Data Directives are a component that manage the flow of data within the system, ensuring efficient routing between subsystems and optimizing memory usage. Data Directives can perform the following functions: (1) they determine the optimal data format and compression for each subsystem, reducing the size and complexity of the data; (2) they allocate and deallocate memory space for each subsystem, avoiding memory leaks or overflows; (3) they handle the data transfer and synchronization between subsystems, minimizing latency and ensuring data integrity; and (4) they cache and reuse data that is frequently accessed or shared by multiple subsystems, improving the system's performance and responsiveness.

The Error Handling Module monitors system operations for irregularities, ensuring the system gracefully recovers from unexpected events. The Error Handling Module is a component that detects and resolves any errors or anomalies that occur during the system's operation. The Error Handling Module can perform the following functions: (1) it monitors the system's status and logs any deviations from the expected behavior, such as crashes, glitches, or bugs; (2) it analyzes the causes and effects of the errors and determines the best course of action to correct them, such as restarting, repairing, or bypassing the affected subsystems; (3) it implements the corrective actions and restores the system's functionality and stability as quickly as possible, minimizing the impact on the user experience and the system performance; and (4) it reports the error occurrences and resolutions to the Task Scheduler and the Data Directives, providing feedback for future improvements and optimizations.

In one embodiment, a Load Balancer distributes the workload among multiple LLM subsystems, ensuring optimal performance and scalability. By way of example, a load balancer is a component that distributes the workload among multiple LLM subsystems, ensuring optimal performance and scalability. A load balancer can perform the following functions: (1) it monitors the system's demand and capacity, such as the number of NPCs, the complexity of interactions, and the gaming environment; (2) it assigns each NPC to the most suitable LLM subsystem, balancing the load and avoiding bottlenecks or overloading; (3) it adjusts the allocation dynamically, based on the changing workload and system status; and (4) it coordinates the communication and synchronization between LLM subsystems, ensuring consistency and coherence across NPCs. In a version of this system's design, one could allocate resources depending on the gaming environment, number of NPCs, and complexity of interactions.

In one embodiment, the system's architecture can be at least partially on Parallel Processing. Multi-threaded Execution facilitates the simultaneous handling of multiple LLM subsystem operations. This ensures that while one AI interaction (e.g., NPC is interacting) is being processed/computed, others can also be processed without delays. The system further comprises a Concurrency Manager that manages multiple operations without conflicts, ensuring data integrity. The system also enable Asynchronous Operations that enable certain operations, especially those requiring deep dives into databases, to run in the background, ensuring seamless front-end interactions.

In one embodiment, the system further includes one or more Large Language Models (LLMs) (also referred to as Local Learning Modules). By way of example, a LLM subsystem is a component of the system that provides natural language generation and understanding capabilities for a non-player character (NPC) in a game. A LLM subsystem consists of a large language model (LLM) that is trained on a large corpus of text and can generate coherent and diverse responses to various inputs. A LLM subsystem also contains modules for context management, emotion modeling, personality modeling, and knowledge retrieval, which enable the NPC to maintain a consistent and engaging interaction with the player. A LLM subsystem can handle different types of interactions, such as dialogue, narration, description, storytelling, and action commands.

In one embodiment, the number LLM subsystems (e.g., also referred to as processors or cores) is scalable to any designated number of subsystems. The technical benefits of using multiple LLM subsystems are as follows: (1) they increase the system's robustness and reliability, as each LLM subsystem can operate independently and handle different scenarios (e.g., if one LLM subsystem fails or encounters an error, the others can continue to function and provide a smooth gaming experience); (2) they enhance the system's diversity and creativity, as each LLM subsystem can generate different responses and behaviors based on its own parameters and models (e.g., this can create more variety and unpredictability in the game, making it more immersive and engaging for the player); and (3) they improve the system's efficiency and scalability, as each LLM subsystem can leverage parallel processing and asynchronous operations to speed up the response time and reduce the computational cost (e.g., this can enable the system to handle more NPCs and interactions without compromising the quality and performance).

In one embodiment, the system includes at least three LLM subsystems that operate in concert to implement differentiated functions that provide for AI interactions: (1) Alpha LLM, (2) Beta LLM, and (3) Omega LLM. It is noted that the three LLM subsystems described in this example is provided by way of illustration and not as limitations. As noted previously, it is contemplated that the system can have any number of LLM subsystems (e.g., processors), and is note limited to the example of three discussed below. These LLM subsystems are the pillars that uphold they system's adaptability and depth. By of example, the first example LLM subsystem is referred to herein as "Alpha LLM". In one embodiment, Alpha LLM includes at least the following functions: (1) Instant Evaluator that provides rapid assessments of player interactions, identifying if responses can be given based on recent interactions or surface-level context; (2) Data Filter that filters out unnecessary data, focusing on relevant player input; and (3) Response Predictor that utilizes past interactions to anticipate possible player actions and preload potential responses.

An example of a second LLM subsystem is referred to herein as "Beta LLM". In one embodiment, Beta LLM includes at least the following functions: (1) Contextual Diver that engages in deeper dives into the data, exploring data from its L1 cache and external L2 storage; (2) Collaborative Processor that interacts with Omega LLM (e.g., IF NEEDED) to ensure the accuracy and relevance of deeper contextual references; and (3) Memory Mapper that traces back interaction history to pinpoint context, especially in longer game or other AI interaction sessions.

An example of a third LLM subsystem is referred to herein as "Omega LLM". In one embodiment, Omega LLM includes at least the following functions: (1) Semantic Decoding—with help from embedding models, this LLM deciphers intricate semantic relationships, drawing from the expansive L4 Vector Database; (2) Structured Database Queries—with the L3 system available, more context for specific datasets can be added to the L2 cache to populate the L1 cache of Omega (or further LLM subsystems if a system demands it); and (3) Advanced Interpolative Logic—this helps in making educated "guesses" when direct information might be lacking, ensuring fluid interactions.

In one embodiment, each LLM communicates via high-speed internal pathways, ensuring rapid data transfer and quick decision-making. Their modular design ensures scalability—new LLMs can be added, or old ones optimized as game or AI interaction designs evolve.

In one embodiment, the system begins with Data Ingestion and Processing. For example, the process of gathering, understanding, and utilizing the vast amount of data that the system interacts with is central to its high functionality. Effective data handling ensures not only efficient operation but also the continual refinement and improvement of NPC responses.

With respect to Data Acquisition, before processing, data needs to be appropriately acquired. Data acquisition, for instance, can be performed via player input stream, game environment data, optional external data integration, and/or the like. For example, Player Input Stream can include but is not limited to: (1) Direct Commands: Key presses, voice commands, or mouse actions made by the player; (2) Behavioral Metrics: Non-direct inputs, such as the time a player spends looking at a certain object, hesitations in decision-making, or patterns of exploration; and (3) Environmental Interactions: Actions like opening doors, toggling switches, or interacting with non-character game entities.

In another example, Game Environment Data can include but is not limited to: (1) State Metrics: Real-time data about the current game state—e.g., weather, time of day, recent events; (2) Narrative Points: Key story events or choices that have occurred which may influence NPC behaviors; and (3) Physics Metrics: Data about the game's physical environment—for instance, disturbances caused by explosions, or the trajectory of thrown objects.

In one embodiment, data acquisition optionally can include External Data Integration that can include but is not limited to: (1) Real-world Events: Some games or AI interactions may choose to integrate real-world events for added immersion, such as fetching real-time weather from the player's location; and (2) Cross-game References: If the gaming platform supports multiple games, data might be ingested about player behaviors in other games to enrich the NPC interactions in the current one.

Once acquired, data be conditioned for the system via Data Pre-processing. Examples of data pre-processing include but are not limited to Noise Reduction, Normalization, and Feature Extraction. For example, Noise Reduction can include but is not limited to: (1) Redundancy Filter: Eliminates repeated or unnecessary data points; and (2) Error Correction: Auto-corrects any recognized unclassified data, anomalies, or glitches in the input to ensure a string output for the LLM subsystems.

In another example, Normalization can include but is not limited to: (1) Scale Adjuster: Ensures all data is on a consistent scale, making comparisons and computations more straightforward; and (2) Data Type Standardization: Converts all inputs into a unified format suitable for processing.

In another example, Feature Extraction can include but is not limited to: (1) Key Event Identifier: Picks out events or actions of significant importance; and (2) Behavioral Cluster Algorithm: Groups patterns of behavior to identify player strategies or tendencies.

In one embodiment, the system uses a novel approach to Data Storage. Proper storage ensures quick and efficient retrieval. Example of data storage include but is not limited to temporal databases and hierarchical storage mechanisms. Temporal Databases can include but are not limited to: (1) Short-term Storage (STS): Holds data relevant for the current play session; and (2) Long-term Storage (LTS): Retains significant player choices, achievements, or patterns across multiple sessions. Hierarchical Storage Mechanisms can include but are not limited to: (1) Priority Assigner: Determines which data is frequently accessed and keeps it ready for retrieval; and (2) Archival System: Manages older data, moving it to deeper storage layers when it's less likely to be immediately needed.

In one embodiment, the various embodiments of a data storage system is implemented as different levels of cache memory, each with a different purpose and data type. It is contemplated that the system can use any number of cache memory or cache memory equivalent. As used herein, cache memory equivalent is a data storage system that mimics the functionality of cache memory, using different memory storage systems (e.g., RAM, relational databases, vector databases, etc.). The example below describes four levels of cache memory or cache memory equivalents (e.g., from L1 to L4), each corresponding to a different memory component. The levels are described as follows.

In one embodiment, Level 1 (L1) is configured as an Immediate Contextual Cache. In other words, a first memory component configured as a first-level (L1) memory cache equivalent to store first data that is transient or immediate. In one embodiment, the purpose of L1 memory is to serve as a cache for the LLM's context or 'system role'. This immediate storage retains information directly related to each individual LLM subsystem operating in the feedback loop. This data generally is transient. As used herein, transient data is data that is temporary, short-lived, or subject to change. Transient data is not meant to be stored permanently or persistently, but rather to be used for immediate processing or analysis. Examples of transient data include user inputs, sensor readings, network packets, or cache data. Transient data can be volatile, meaning that it can be lost when the power is turned off, or non-volatile, meaning that it can be retained in some form of memory. Transient data can also be contrasted with persistent data, which is data that is intended to be stored for a long time (e.g., greater than a threshold duration) and remain consistent. In a video game context, Example L1 data types include but are not limited to: (1) Instantaneous Player Input: User data, inputs, commands, and actions which demand swift reactions; and (2) Current NPC States: The NPC's present status, intention, or immediate past actions (added by L2 cache with context injections during processing loops such as those described with respect to FIGS. 2A-2G and FIGS. 4A-4B). As discussed, L1 data can include but is not limited to Transient Environmental Data (e.g., short-lived game state changes, such as a temporary weather shift). Characteristics and/or technical benefits of L1 data types include but are not limited to: (1) High Throughput: Built for extremely fast read/write operations; and (2) Volatile: Data is ephemeral and can be replaced rapidly based on the dynamic game state.

In one embodiment, Level 2 (L2) is configured as an In-memory Operational Cache. The purpose of L2 is to operate as the system's RAM or in-memory cache. For example, it maintains key values and critical information to aid the LLM subsystems in orchestrating feedback loops, commands, and outputs efficiently. In a video game context, example L2 data types include but are not limited to: (1) Player Behavioral Patterns: Short-term patterns that inform NPC reactions; (2) Game Event Metadata: Contextual information about current events that NPCs might reference; and (3) Query Results: The L2 system will store a limited amount of queried results from either the L3 or L4 systems. Characteristics and/or technical benefits of L2 data include but are not limited to: (1) Rapid Access: Data here can be pulled up with minimal latency; and (2) Dynamic: Regularly updated with new insights and data to remain contextually relevant.

In one embodiment, Level 3 (L3) is configured as a Structured Persistent Database. The purpose of L3 is to function as a traditional structured database. This level is tapped for persistent data that encompasses, for instance, detailed character profiles, game lore, overarching narratives, and more. In a video game context, example L3 data types include but are not limited to: (1) Character Backstories and Profiles: Deep insights into NPCs, their histories, and personalities; and (2) Game Knowledge & Lore: Historical events, legends, maps, and other fixed game information. Characteristics and/or technical benefits of L3 data include but are not limited to: (1) Consistency & Reliability: Ensures that the game's core knowledge remains unaltered and available; and (2) Structured Queries: Optimized for structured data retrieval using SQL or similar query languages.

In one embodiment, Level 4 (L4) is configured as a Vectorized Semantic Database. The purpose of L4 is to provide a more advanced storage solution resembling databases like Pinecone or Weaviate. It specializes in holding long-term memories and other nuanced data in semantic clusters. This allows for the extraction of contextually relevant information through vector space searches and KNN (K-Nearest Neighbors) results. In a video game context, example L4 data types include but are not limited to: (1) Semantic Memory Clusters: Aggregated data points that provide nuanced context about past player-NPC interactions; and (2) Long-term Behavioral Insights: Player preferences, play style, and decisions that span multiple gaming sessions. Characteristics and/or technical benefits of L4 data include but are not limited to: (1) Deep Context Retrieval: Can extract deeply contextual data based on nuanced queries; (2) Vector Space Searches: Uses the vector nature of the data to find the most relevant information based on proximity in the vector space; and (3) Index Categories: Within Vector Databases, there is an option to segment regions of semantic data to specific dimensions or indexes to contain realms of information that should not merge with other types (which may cause confusion for KNN results in the Deep LLM Omega loop).

In one embodiment, the system can then perform Data Processing and Analysis. By way of example, this is where data is converted into actionable insights. Example data processing and analysis processes include but are not limited to: (1) Real-time Analytics; (2) Deep Learning Algorithms; and (3) Feedback Loop. For example, Real-time Analytics include but are not limited to: (1) Contextual Awareness: The various embodiments described herein can evaluate the immediate game environment to determine NPC responses; and (2) Predictive Analytics Engine: Anticipates player actions based on current behavior and past data (may include pre-trained models or player-trained).

Deep Learning Algorithms, for instance, can include but are not limited to: (1) Behavioral Recognition Neural Network: This various embodiments described herein may use nuanced player behaviors to refine NPC interactions accordingly; and (2) Sentiment Analysis: For games with voice interactions, this gauges player emotions to adapt responses. This can be performed during the String Output generation.

The Feedback Loop, for instance, can include but is not limited to: (1) Performance Metrics: Evaluates how effectively NPCs responded and uses this data to refine future interactions; and (2) Reinforcement Learning: Adjusts weightings and biases in the system based on successful or unsuccessful interactions, continually enhancing AI interactions (e.g., NPC accuracy and relevance).

In one embodiment, the system includes a Contextual Enrichment Mechanism. The Contextual Enrichment Mechanism, for instance, is a component of the Adaptive Semantic Interaction System (ASIS). In a video game context, it acts as the heart of the system, ensuring that NPC interactions in video games are not just static, pre-defined dialogues, but dynamic and evolving engagements based on context. This section delves into the intricate processes, technologies, and methodologies utilized.

In one embodiment, the Contextual Enrichment Mechanism comprises Cache Collaboration. More specifically, L2 cache collaboration is a component responsible for real-time and short-term data storage. It primarily focuses on retaining recent engagements to inform the L1 with context. L2 cache collaboration includes Recent Interactions Storage which serves to capture and store the most recent AI interaction (e.g., player-NPC interactions). The storage duration of these recent interaction is relatively short. Typically, the system maintains this data for a few minutes to hours, ensuring that subsequent engagements recall recent exchanges. In one embodiment, the data structure for this data utilizes a LIFO (Last In, First Out) data structure (or equivalent) to ensure the most recent interactions are quickly accessible. The limit depends on the game design and system used to run the AI environment.

The system can also include Data Enrichment. In a video game context, Data Enrichment can include but is not limited to the following components: (1) Context Aggregator: Extracts context from various game activities, such as recent achievements, player decisions, or nearby NPC interactions; (2) Player Profile Informer: Retrieves player-specific data like their preferred gameplay style, earlier decisions, and in-game relationships, enhancing the context; and (3) World State Analyzer: Gleans information about the overall game environment and state, considering elements like time, weather, and ongoing events.

The system can further include Deep Contextual Analysis. Deep Contextual Analysis dives deeper, bridging the gap between real-time interactions and the vast expanse of semantic relationships stored in the L3 and L4 databases. In one embodiment, Deep Contextual Analysis comprises L3 Collaboration. In a video game context, L3 Collaboration, for instance, can include but is not limited to: (1) Historical Data Pool: Holds a record of extended interactions and player choices, archiving significant moments or patterns.; and (2) NPC Memory Emulator: Creates a semblance of 'memory' for NPCs, allowing them to reference past engagements or encounters with a player. This includes the idea of 'revolving states of awareness' where the system may log how its NPC would feel about responses or events.

The system can further comprise L4 Vector Database Collaboration. In a video game context, L4 Vector Database Collaboration can include but is not limited to: (1) Semantic Relationships: An embedding system (such as Ada from OpenAI) is designed to fit the system to help with embedding queries and returning vectors to their string origins (e.g., the various embodiments described herein use Vector Databases and Embedding models to decipher relationships between various data points, allowing NPCs to grasp subtle connections, like understanding a player's affinity for a particular in-game faction); (2) Emotion Detector and Projector: Understands player sentiments based on textual, auditory, or gameplay cues. NPCs can then respond empathetically or antagonistically, deepening the immersion; and (3) Temporal Context Analyzer: Recognizes the significance of time in gameplay, enabling NPCs to reference past events, anniversaries, or forthcoming occurrences.

In one embodiment, the system further comprises a Contextual Fusion Engine that combines all gathered context to generate a rich profile for the player-NPC interaction. This Contextual Fusion Engine can include a Multi-dimensional Contextual Array that holds various context layers-immediate, short-term, and long-term. The Engine can also include Dynamic Prioritization Algorithm that assign importance levels to each context type, ensuring the most relevant context guides the interaction.

In a video game context, the system can further include an NPC Character Template Overlay. This Overlay helps to ensure that the NPC's character—their motives, personality, history—is considered when deciding how to engage. The Overlay can further include a Personality Matrix that is a multi-faceted system that defines an NPC's traits, likes, dislikes, and boundaries. The Contextual Fusion Engine ensures that reactions align with this matrix.

In one embodiment, the system includes a Feedback Loop and Learning Mechanism to ensure that the system constantly evolves based on player feedback. The Feedback Loop and Learning Mechanism can include but is not limited to: (1) a Player Feedback Parser; and (2) an Adaptive Learning Integrator. The Player Feedback Parser analyses and categorizes player feedback, be it explicit through in-game rating systems or implicit, like player's frequency or style of interaction with a specific NPC. The Adaptive Learning Integrator implements learning algorithms, adjusting the contextual engagement patterns based on feedback to constantly refine NPC interactions.

In one embodiment, the system further includes an Immersive Dialogue Loop System. The Immersive Dialogue Loop System can include but is not limited to the following components: (1) Immediate Response Pathway; and (2) Extended Contextual Evaluation. By way of example, the Immediate Response Pathway is a critical facet of the ASIS. It is responsible for providing real-time dialogue interactions with NPCs, ensuring minimal wait times and a smooth gaming experience.

In one embodiment, the Immediate Response Pathway can include a Creative Molder that generates dynamic responses based on the immediate context of the player's interaction. It can access a vast library of pre-scripted dialogue fragments and creatively pieces them together. Sub-Components of the Immersive Dialogue Loop System include but are not limited to: (1) Dialogue Fragment Library: Contains thousands of possible phrases, sentences, or words; (2) Contextual Sentiment Analyzer: Determines the emotional tone of the player's input (e.g., aggressive, friendly, neutral); (3) Grammar and Syntax Adjuster: Ensures that the molded dialogue is linguistically coherent.

The Immediate Response Pathway can also include a Short-term Memory Log that keeps track of recent player-NPC interactions, helping NPCs reference past interactions in ongoing dialogues. Sub-Components of the Short-term Memory Log include but are not limited to: (2) Session Recorder: Captures the player's actions and dialogues in the current gaming session; and (3) Retrieval Mechanism: Allows NPCs to pull up past interactions for context in real-time dialogues.

The Immediate Response Pathway can also include Semantic Enrichment that deepens the NPCs' understanding of dialogue context, making their responses more nuanced and aware. Sub-Components of the Semantic Enrichment module include but are not limited to: (1) Embedding Models: Uses advanced machine learning models to convert words and sentences into high-dimensional vectors that represent meaning; and (2) Relationship Mapper: Determines how various word vectors relate, helping NPCs understand context, irony, sarcasm, etc.

In one embodiment, Immersive Dialogue Loop System further includes an Extended Contextual Evaluation. Sometimes, simple, immediate responses are not enough. The system needs to delve deeper into context or history for richer dialogue. The Extended Contextual Evaluation is directed to meeting this need. By way of example, the Extended Contextual Evaluation includes but is not limited to: (1) a Delay Mechanism; and (2) a Dynamic Response Generation. In scenarios where the AI takes longer to process a response, the Delay Mechanism introduces 'natural' in-game delays to make NPCs appear thoughtful or hesitant, preserving immersion. Sub-Components of the Delay Mechanism include but is not limited to: (1) a Temporal Analyzer: Estimates the required time for processing and chooses an appropriate in-game reaction; and (2) a Reaction Library: Contains animations, gestures, or filler dialogues (e.g., "Let me think . . . ").

The Dynamic Response Generation crafts intricate dialogues by integrating game lore, past interactions, and NPC character traits. Sub-Components of the Dynamic Response Generation include but are not limited to: (1) Lore Database Interface: Connects to the game's lore database to weave in relevant history, stories, or trivia; (2) Character Profile Accessor: Each NPC has a unique character profile detailing their history, relationships, likes, and dislikes (e.g., this accessor ensures that all dialogues align with these profiles); and (3) Adaptive Dialogue Scripter: This innovative module can script dialogues on-the-fly, ensuring that even lengthy, intricate conversations feel organic and unrehearsed.

Figure 5:
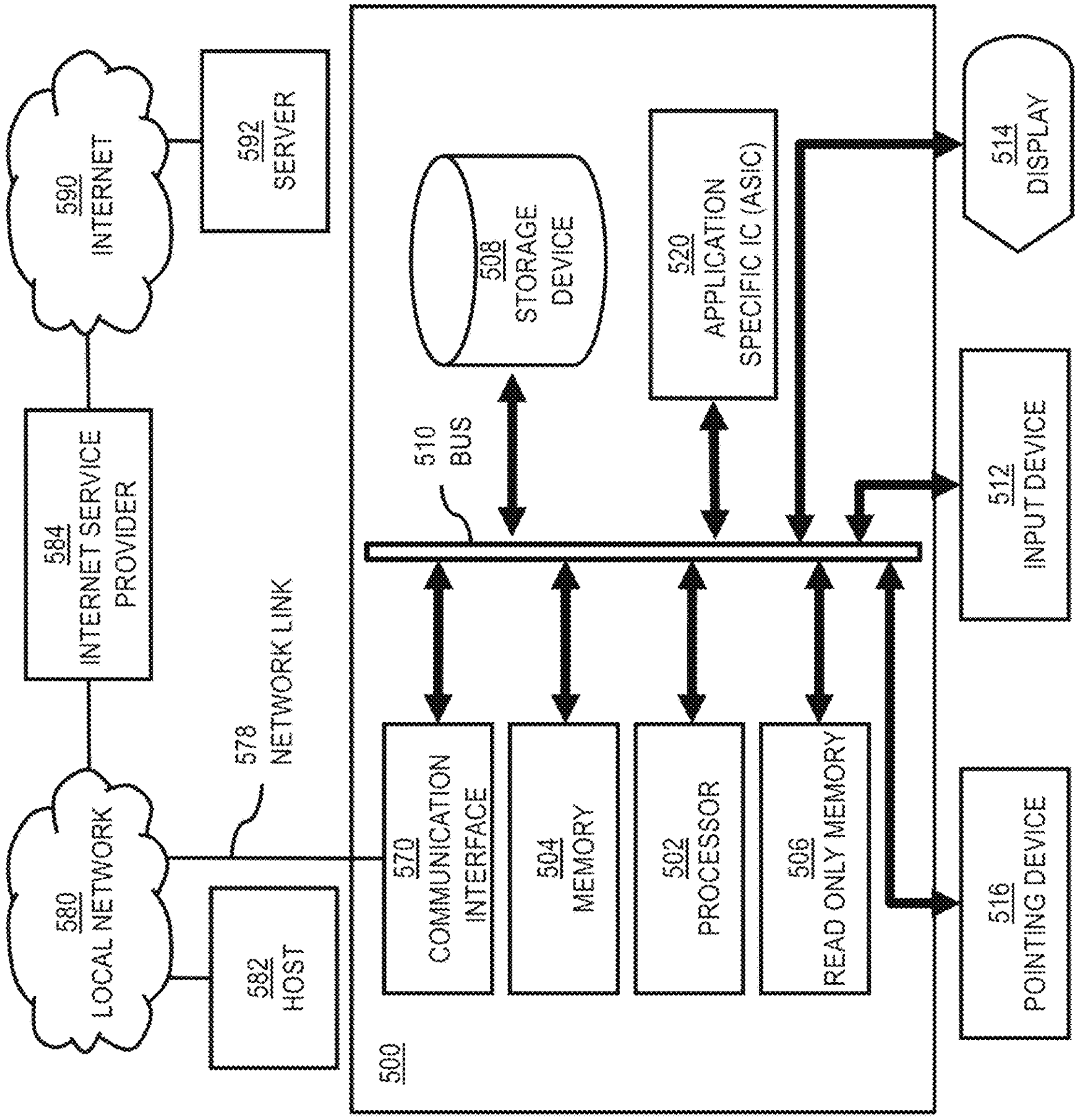
FIG. 5 is a diagram of hardware that can be used to implement an embodiment.
Figure 6:
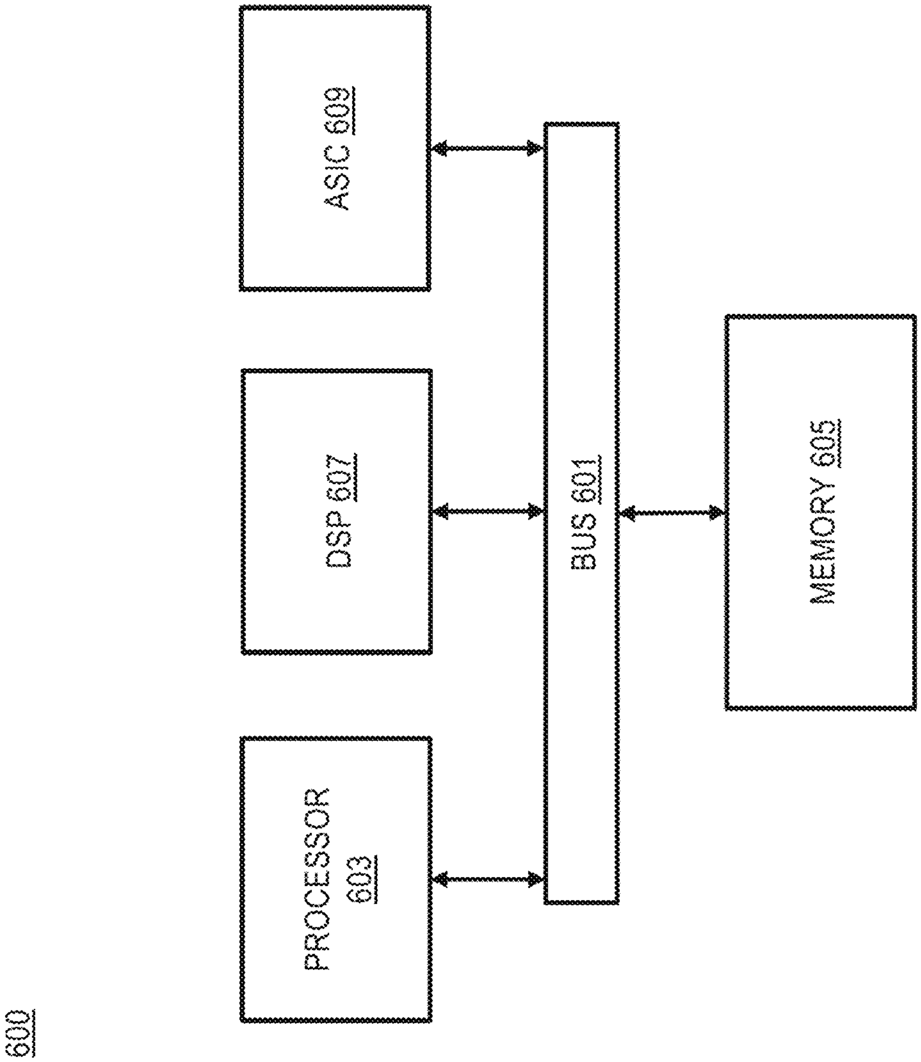
FIG. 6 is a diagram of a chip set that can be used to implement an embodiment.
Figure 7:
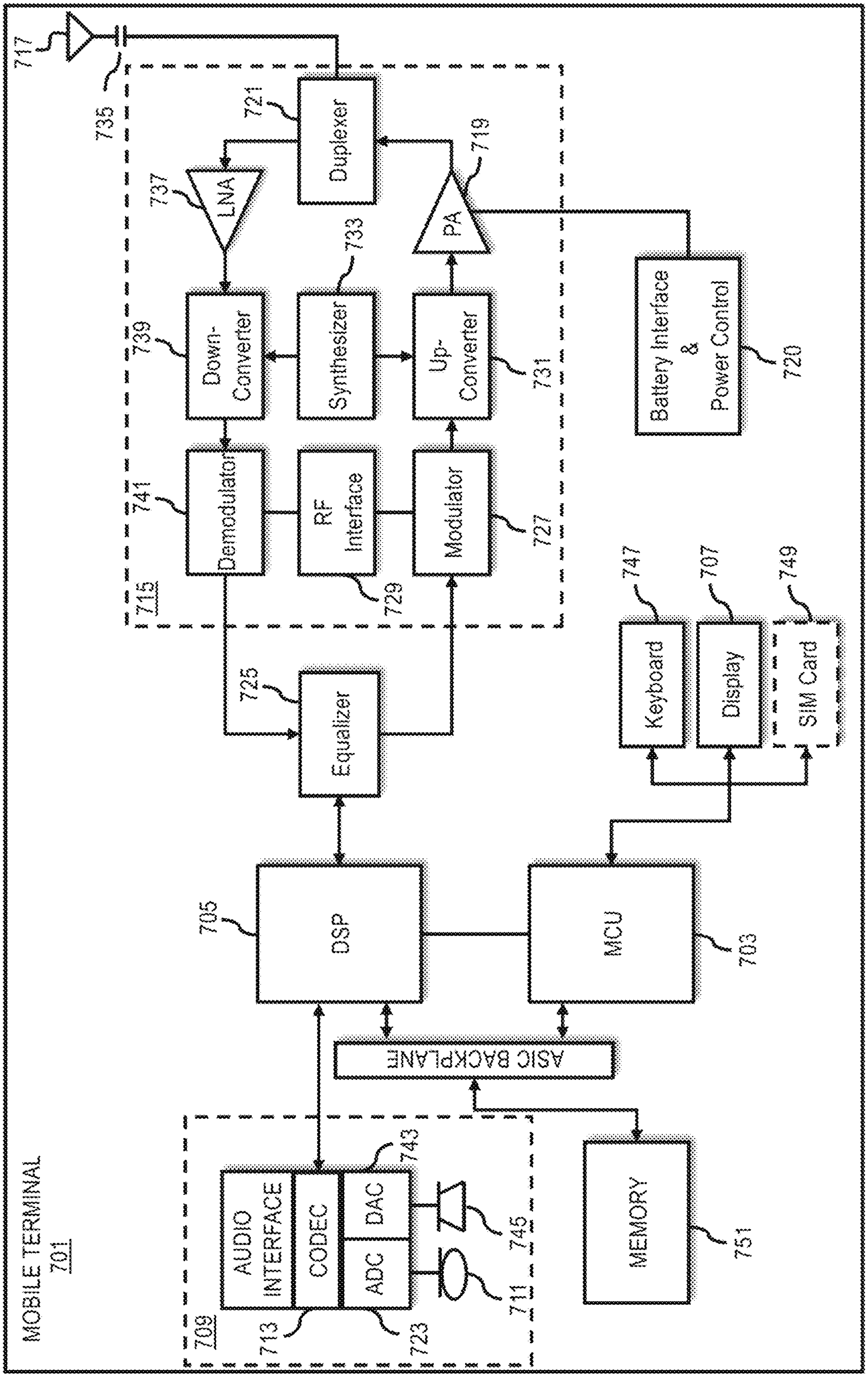
FIG. 7 is a diagram of a mobile station (e.g., handset) that can be used to implement an embodiment.

FIG. 1 is a diagram of a string output flowchart for diverse data inputs, according to one embodiment. In one example, the system and/or any of its components/circuitry may perform one or more portions of a process 100 and may be implemented in/by various means, for instance, one or more chip sets including a processor and a memory as shown in FIGS. 5-7 or in a circuitry, hardware, firmware, software, or in any combination thereof. As such, the system and/or any associated component, apparatus, device, circuitry, system, computer program product, method, and/or non-transitory computer readable medium, or any combination thereof, can provide means for accomplishing various parts of the process 100, as well as means for accomplishing embodiments of other processes described herein. Although the process 100 is illustrated and described as a sequence of steps, it is contemplated that various embodiments of the process 100 may be performed in any order or combination and need not include all of the illustrated steps.

As shown, FIG. 1 outlines the intricate procedure by which diverse, incoming data is deconstructed into context-rich strings, primed for the LLM subsystem's comprehension and efficient processing. While this depicts one particular methodology, any viable string input generation approach can integrate seamlessly with the LLM subsystems.

The steps of the process 100 are described below.

1. Initial Data Reception:

At process 101, the system is alerted by the arrival of a new data input. It may manifest as text, audio, or other multimedia formats. Regardless of its form, the system's primary task is to shape this data into contextual strings for LLM subsystem assimilation. By way of example, the new data input can arrive through channels such as but not limited to: (1) a user query/interaction entered via a graphical user interface (GUI) or a voice command; (2) a data stream from an external source, such as a web service, a sensor, or a database; and/or (3) a feedback signal from the system itself, indicating its performance or state.

2. Data Type Determination:

At process 102, the system deciphers the data's nature. By way of example, the system deciphers the new data input's nature by applying various methods of data analysis, such as feature extraction, dimensionality reduction, clustering, classification, or regression. Depending on the type and source of the data, the system may use different techniques or combinations thereof to identify the most relevant and informative aspects of the data for the LLM subsystem.

For example, to decipher the data, at process 103, the system poses a fundamental question: Is the data inherently string-based? An affirmative leads to data preparation, while a negative spurs further analysis.

3. Audio Data Analysis:

At process 104, the system discerns whether the data is audio-centric.

At process 105, the system confirms its audio nature. For example, the data undergoes transcription via Speech-to-Text (STT) methodologies. Concurrently, sound detection algorithms might be deployed to grasp non-verbal auditory cues. For example, the system confirms the audio nature of data by applying various techniques to extract and analyze the acoustic features of the data. For example, the system may use signal processing methods such as Fourier transform, wavelet transform, or Mel-frequency cepstral coefficients (MFCC) to represent the frequency, amplitude, and temporal characteristics of the sound waves. The system may also use machine learning models such as convolutional neural networks (CNN), recurrent neural networks (RNN), or transformers to classify, segment, or generate the audio data based on its content and context. These techniques enable the system to identify the source, type, and meaning of the audio data, as well as any associated emotions, intents, or sentiments.

4. Video Data Analysis:

At processes 106-107, if the data is not audio-based, the system investigates its potential video essence. The system, for instance, recognizes it as such prompts video data decomposition, amalgamating multimodal inputs like sound, visuals, and potential textual overlays to derive context. For example, the system investigates the potential video essence of data by applying various techniques to extract and analyze the visual features of the data. For example, the system may use computer vision methods such as face detection, object recognition, scene segmentation, or optical character recognition (OCR) to identify the elements, locations, and actions in the video frames. The system may also use machine learning models such as convolutional neural networks (CNN), recurrent neural networks (RNN), or transformers to classify, caption, or generate the video data based on its content and context. These techniques enable the system to understand the meaning, purpose, and message of the video data, as well as any associated emotions, intents, or sentiments. The system then combines the multimodal inputs from the audio, visual, and textual components of the video data to derive a holistic representation of the video essence. This representation captures the semantic and syntactic relationships among the different modalities and provides a comprehensive understanding of the video data.

5. Image Data Processing:

At process 108-109, should the data remain unidentified, the system probes its image attributes. The system, for instance, discovers its pictorial nature, image recognition techniques are harnessed, extracting themes, objects, and any textual components. For example, the system may use computer vision methods such as face detection, object recognition, scene segmentation, or optical character recognition (OCR) to identify the elements, locations, and actions in the image. The system may also use machine learning models such as convolutional neural networks (CNN), recurrent neural networks (RNN), or transformers to classify, caption, or generate the image based on its content and context. These techniques enable the system to understand the meaning, purpose, and message of the image data, as well as any associated emotions, intents, or sentiments. The system then derives a representation of the image essence that captures the semantic and syntactic relationships among the themes, objects, and textual components of the image. This representation provides a comprehensive understanding of the image data.

6. Other Data Types:

At process 110, the system does not dismiss unmatched data types. The system is equipped to engage alternate processing channels, adapting to varied, perhaps even unconventional, data forms. In other words, the system can process other data types that may not fit into the categories of text, speech, or image. For example, the system may leverage domain-specific knowledge and external resources to enrich its understanding of the data and its relevance to the task at hand. The system then generates a representation of the data essence that captures the semantic and syntactic relationships among the different modalities, components, and aspects of the data. This representation provides a comprehensive understanding of the data and enables the system to perform further processing and reasoning.

7. String Output Preparation:

At processes 111-112, having distilled context from diverse data streams, the final step involves molding this into a string output. This meticulously crafted output is now primed to serve as input in ensuing LLM subsystem engagements. In other words, the system molds the distilled diverse data streams into a string output that can be consumed by the LLM subsystems. The system applies various techniques and methods to transform the representation of the data essence into a string expression that preserves the essential information and context of the original data. The system also ensures that the string output is aligned with the task and domain requirements. The system may use different string generation methods, such as but not limited to template-based, rule-based, statistical, or neural, depending on the complexity and structure of the data and the desired output format. The system then outputs the string as input for the next stage of processing in the LLM subsystems.

FIGS. 2A-2G are diagrams of a flowchart of the LLM subsystems in string input processing, according to one embodiment. In one example, the system and/or any of its components/circuitry may perform one or more portions of a process 200 and may be implemented in/by various means, for instance, one or more chip sets including a processor and a memory as shown in FIGS. 5-7 or in a circuitry, hardware, firmware, software, or in any combination thereof. As such, the system and/or any associated component, apparatus, device, circuitry, system, computer program product, method, and/or non-transitory computer readable medium, or any combination thereof, can provide means for accomplishing various parts of the process 200, as well as means for accomplishing embodiments of other processes described herein. Although the process 200 is illustrated and described as a sequence of steps, it is contemplated that various embodiments of the process 200 may be performed in any order or combination and need not include all of the illustrated steps.

FIGS. 2A-2G offer a comprehensive look into the journey of a string input as it navigates the LLM subsystems (e.g., three LLM subsystems: Alpha, Beta, and Omega). It underscores the malleability of the system; with varying configurations, the subsystems can be fine-tuned to bolster response accuracy. In one embodiment, interoperability and the network nature of a processor (LLM subsystem) could be scalable. Alpha, Beta, and Omega are not finite; there could be infinite processors (cores) with sub-tasks of alpha, beta, omega, delta, gamma, etc., to a maximum designated number of subsystems (e.g., up to infinity). This could hold true to the point that there could be a large information network of processors with L2, L3, and L4 caches assigned to them, possibly shared between cores, possibly not shared between cores. It is possible to have an output of one processor core leading into the input of another processor core.

The process 200 is illustrated in parts over the FIGS. 2A-2G and includes the following steps.

1. Commencement:

At process 201, the process 200 initiates with the system obtaining a fresh string input destined for the LLM subsystems. As previously discussed, an LLM subsystem, for instance, is a component of the system that performs language modeling and generation tasks. An LLM subsystem consists of a neural network architecture that can learn from large amounts of text data and generate natural language outputs based on various inputs and objectives. The system may have multiple LLM subsystems, each with different capabilities and specializations, such as Alpha, Beta, and Gamma LLMs. The LLM subsystems can work together or independently to produce high-quality and relevant language outputs for the system's users.

2. Contextual Groundwork:

At processes 202-204, prior to deep processing, the string input is enriched with data from the L2 cache. In a video game context, this could encompass recent chats, character data, or recent forays into the L3 or L4 databases. Such a foundation ensures the Alpha LLM operates with ample context. By way of example, the L2 cache is a memory storage that contains relevant information from previous interactions and queries with the system. The data from the L2 cache can help the system understand the context and intent of the user's input, as well as provide additional details and facts that may be useful for generating a response. For example, if the user asks about a specific character or location in a video game, the L2 cache may contain information about that character or location from previous chats, searches, or gameplays. The system can use this information to enrich the string input with more background and specificity, such as the character's name, appearance, personality, role, or relationships, or the location's name, description, history, or significance. This way, the system can provide more accurate and engaging language outputs that match the user's expectations and interests.

Accordingly, in one embodiment, the system comprises a data component configured to receive one or more data types, and to convert the one or more data types to one or more string-based representations for storage in the L1 memory cache equivalent, the L2 memory cache equivalent, the L3 memory cache equivalent, the L4 memory cache equivalent, or a combination thereof.

3. Alpha LLM's Mandate:

At process 205, the Alpha LLM (e.g., Quick Response LLM Subsystem) takes the lead, ingesting both the primary message and its contextual backdrop. A Quick Response LLM subsystem is a component of the language generation system that can produce fast and fluent language outputs based on the user's input and the contextual backdrop. It uses a pre-trained neural network model that can generate natural and coherent sentences across different domains and tasks. The Quick Response LLM subsystem can decide whether to offer a final response or delay for deeper processing, depending on the complexity and specificity of the user's input and the available data from the L2 cache. A final response from the Quick Response LLM subsystem can include various elements, such as text, speech, animation, or graphics, to create an immersive and interactive experience for the user.

In one embodiment, the Alpha LLM can include a built-in L1 cache that stores the most frequently used and relevant data for generating language outputs. The L1 cache is a fast and small memory storage. For example, the L1 Cache is filled with context about the Quick-Response LLM's role, their capabilities, command options, and list/array of key values associated with response presets. It also includes the last (N) iterations for short term memory (e.g., chats, queries, etc.). This response is built to be very short (e.g., below a threshold number of words or tokens), direct, and streamlined for efficiency and timely response generation to fill the "Delay Cover" for deeper processing by other LLM models in the system (for context retrieval).

At process 206, within this subsystem 205, a decision emerges: whether to offer a final response or delay for deeper processing. Alpha LLM's L1 cache, replete with guidelines, aids this determination. By way of example, some example guidelines in Alpha LLM's L1 cache that can aid the determination of whether to offer a final response or delay for deeper processing include but are not limited to:

(1) The length and complexity of the user's input. If the input is short and simple, the Quick Response LLM subsystem may be able to generate a final response based on the data from the L1 cache. If the input is long and complex, the Quick Response LLM subsystem may need more information from the L2 cache or other sources to produce a satisfactory output.

(2) The availability and relevance of the data from the L2 cache. The L2 cache is a larger and slower memory storage that contains more detailed and diverse data for language generation. The Quick Response LLM subsystem can access the L2 cache to retrieve additional context, facts, or references that can enrich the final response. However, if the L2 cache is not available or does not have relevant data for the input, the Quick Response LLM subsystem may decide to delay for deeper processing by other LLM models in the system (for context retrieval).

(3) The confidence and quality of the generated output. The Quick Response LLM subsystem can use various metrics and methods to evaluate the confidence and quality of the generated output, such as perplexity, coherence, fluency, relevance, accuracy, and diversity.

If the output meets a certain threshold of confidence and quality, the Quick Response LLM subsystem can offer it as a final response. If the output is below the threshold, the Quick Response LLM subsystem may decide to delay for deeper processing by other LLM models in the system (for context retrieval).

At process 207, electing a final output means a swifter conclusion, eschewing the extended query loops depicted. For example, the final output command overrides the Query LLM loop to issue a Quick Response (e.g., predefined trigger events to handle basic questions, reactions, etc. that do not require extensive context).

At processes 208-210, this final response, while appearing singular, is multifaceted—comprising instructions for text to speed (TTS), animation cues, and more. For example, the Final Output Command splits the command instructions based on one or more answering templates that are defined in Quick Response L1 Cache. This process includes splitting the response into relevant segments for TTS, Animation, and/or Reaction Types that are quickly rendered by overall system. By way of example, an answering template is a predefined format for constructing a response to a user query based on the type and content of the query. An answering template can specify how to structure the response in terms of text, speech, animation, and reaction cues, as well as how to fill in the placeholders with relevant information from the query or the context. For example, an answering template for a yes-no question may include a binary answer (yes or no), followed by a justification (e.g., "because . . . "), and an appropriate animation and reaction (e.g., nodding or shaking head, smiling or frowning, etc.). An answering template can also indicate the level of confidence and quality of the response, and whether it requires further processing by other LLM models.

At process 209, System efficiency hinges on deft string parsing; delimiters like ": : :" can facilitate this, ensuring optimal comprehension and storage.

4. Transition to Beta LLM:

At process 211, if Alpha LLM calls for delay, Beta LLM is beckoned, signaling the next stage. For example, the system Delete Output Command starts the RAM Query LLM Loop to answer the final output after more processing.

At processes 212-215, this delayed output, while still a string, conveys complex directives—e.g., set to guide the ensuing RAM Query phase within the LLM. In one embodiment, the Delay Output Command splits the Command Instructions (e.g., for accessing L2 cache) based on Answering Template that is defined in Quick Response L1 Cache. This includes splitting the relevant command and message/instructions for Query LLM to render.

214-216: Here, L2 cache emerges as a lynchpin, supplying key-values and IDs that underpin Beta LLM's understanding. For example, the L2 Cache serves as the RAM for the system outside of L1 cache. This can store limited amounts of key values (such as Character info, basic world knowledge, etc.) with extended context in L3 that can help answer questions in a persistent manner. So if information cannot be defined by L2 Cache and Reference System, L3 or L4 are queried in another Loop Extension for Deep-Thought LLM. L4 is used, for instance, if the system needs access to semantic data clusters/vectors for context. If there is relevant information under the direct pointer L3, then the system will use that.

5. Deepening the Contextual Inquiry:

At processes 217-219, the RAM Query LLM's (Beta LLM's) main challenge is discerning whether it can offer a final response or if it needs to usher the process into the Omega LLM's domain. Similar to the Alpha LLM, the L1 Cache of the Beta LLM is filled with context about the RAM Query LLM's role, their capabilities, command options, and list/array of key values associated with how the system should handle specific entries. The response is built to be very short (e.g., below a threshold number of words or tokens), direct, and streamlined for efficiency and timely response generation to provide the index query guidelines for Deep LLM Subsystem (Omega LLM) to retrieve context from L3 and L4 caches if needed, or this subsystem can finalize the output if context is in L2.

At processes 220-225, for deeper dives—like historical data recalls—an updated delay output may be fashioned, amalgamating prior outputs and ushering them to subsequent stages. The system answers whether the RAM query LLM Subsystem (Beta LLM) answer the final output by asking whether it needs information from L3, L4, or both to provide the final output. If L3 is needed, the RAM Query LLM will have pointers to guide the system when collecting context from the persistent L3 Database (e.g., using L2 to Store Context from the last N searches). If both are needed, the RAM Query LLM may choose to gather context from BOTH the L3 and L4 caches/databases. This potentially-extended processing time will have been compensated for by the Delay Output. If L4 is needed, the RAM Query LLM will prepare a Vector Query that is split from the Updated Delay Output by the system. The Vector Query will be embedded for semantic search in the index listed (e.g., RAM Query LLM has list/array of available index categories if it needs to search Vector DB *like long term memories, chats, new information, etc.)

At processes 226-230, L3, akin to a data vault (think MongoDB or Firebase), holds persistent information, transcending the ephemeral L2 cache. For example, the L3 Persistent Data will be gathered based on the pointers declared by the RAM Query LLM response. Once invoked, this context is synthesized with the Beta LLM's output, prepped for any potential L4 intervention.

6. L4 Vector Database and Semantic Exploration:

At processes 231-235, when a semantic search beckons, Beta LLM crafts a vector query, parsing it from the accumulated output and gearing up for a meticulous scour across Vector DB indexes. For example, an embedding AI model is used to query the L4 Vector Database. Once the L4 vector KNN results arrive, there will be a need to be a reverse action for the system to return and embedding a string.

At process 236: Post this search, the unearthed semantic nuances are integrated, preparing the string for the Omega LLM's expertise. For example, the L4 Semantic Data will be gathered based on the indexes declared by the RAM Query LLM response to update the delay output.

7. Omega LLM's Culmination:

At process 237: Omega LLM (Deep LLM Subsystem), the final gatekeeper (according to this non-limiting example), imbibes context from L3 and L4.

Figure 3:
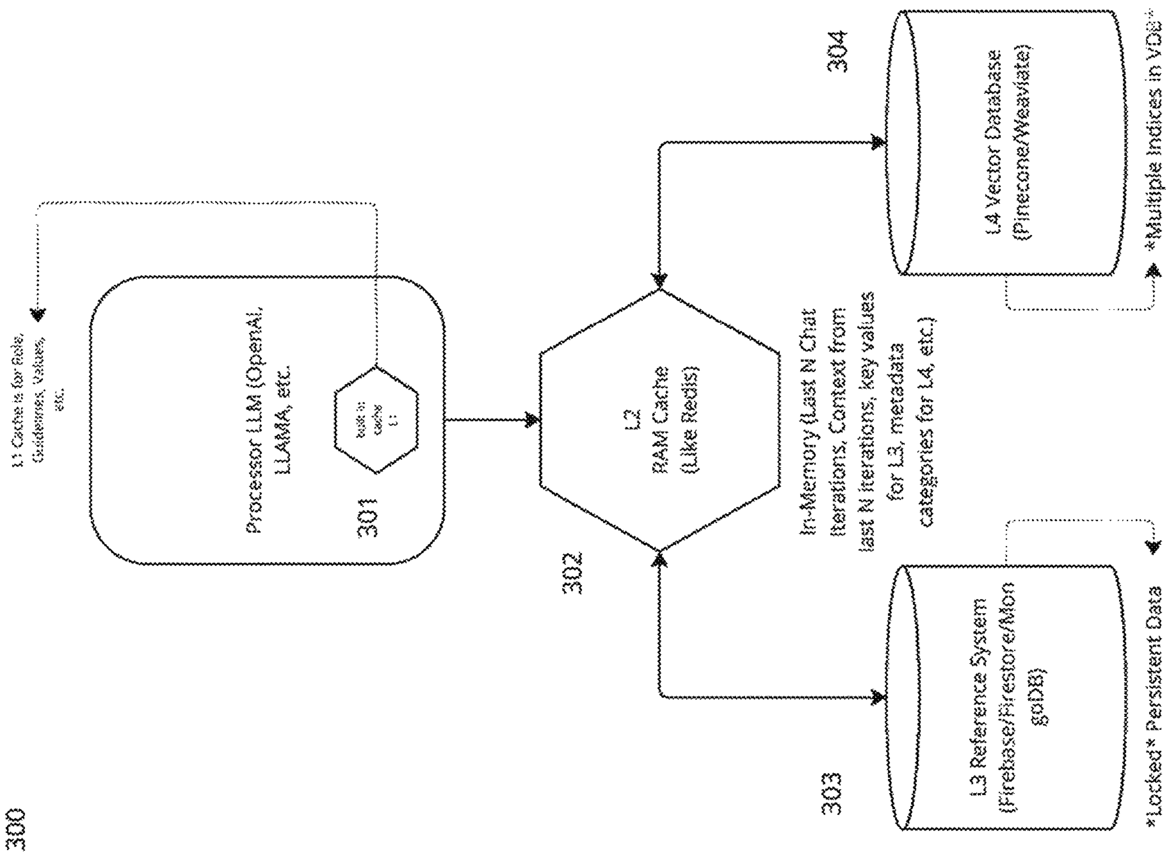
FIG. 3 is a diagram of storage systems, according to one embodiment.

FIG. 3 is a diagram of storage systems, according to one embodiment. More specification, FIG. 3 illustrates an example data storage architecture 300 that consists of the intricate layers of data organization spanning from the internal confines of the LLM cache to the vast expanses of in-memory (System/App RAM), traditional structured databases, and cutting-edge vector databases.

The architecture 300 comprises the following components and processes.

1. Internal LLM Cache (L1):

At process 301, this L1 cache 301 stores context for the Processor/AI subsystem, allowing each model to perform according to set-parameters or guidelines that are written as prompts or instructions for each LLM model in a 'critical thought chain'.

2. In-memory (System/App RAM) (L2):

At process 302, a step outside the LLM's immediate confines brings us to the in-memory storage, often referred to as System or App RAM (L2). This space acts as a bridge between swift internal caches (e.g., L1) and more enduring storage solutions (e.g., L3 and L4). It houses frequently-used datasets, operational data, and real-time application states. While more expansive than the LLM L1 cache, in-memory storage remains volatile. Its contents are susceptible to changes, ensuring application agility while maintaining performance.

3. Structured-Traditional Databases (L3):

At process 303, venturing further, we encounter the structured-traditional databases. These stalwarts of data organization offer a blend of stability and structure. Designed for long-term data preservation, they contain well-defined tables, rows, and columns, providing a methodical layout conducive to structured queries. Beyond mere storage, these databases offer transactional capabilities, ensuring data integrity and reliability. L3 examples could be Firebase/MongoDB/etc.

4. Vector Databases (L4):

At process 304, on the frontier of modern data organization stands the vector database. These databases have evolved to cater to the nuanced demands of semantic and contextual searches. Unlike traditional databases, vectors prioritize data relationships, mapping semantic connections within vast datasets. This allows long term memories, events, and historical information to be retrieved based on semantic relationships to an embedded query for the database. In one embodiment, the vector database employs one or more algorithms for discerning one or more patterns, one or more trends, one or more relationships, or a combination thereof in the fourth data stored in the vector database.

In summary, in one embodiment, the system for data storage in an AI computing environment comprises: (1) a first memory component configured as a first-level (L1) memory cache equivalent to store first data that is transient; (2) a second memory component configured as a second-level (L2) memory cache equivalent to store second data that is not held within the in-memory data store and is accessed at greater than an L2 frequency threshold; (3) a third memory component configured as a third-level (L3) memory cache equivalent to store third data that is accessed at less than the L2 frequency threshold and at greater than an L3 frequency threshold; and (4) a fourth memory component configured as a fourth-level (L4) memory cache equivalent to store fourth data that is accessed at less than the L3 frequency threshold. In one embodiment, one or more Large Language Model (LLM) subsystems configured to process the first data, second data, the third data, the fourth data, or a combination thereof to generate an output response.

In one embodiment, a memory component is a hardware or virtual device that can store data temporarily or permanently in an AI computing environment. Memory components can have different levels of performance, capacity, and cost depending on the frequency and size of data access. The higher the level of the memory component, the faster and more expensive it is. Memory components can be used to cache data from other sources, such as solid state drives or cloud storage, to improve the speed and efficiency of data processing. By way of example, the first memory component is an AI model cache (e.g., LLM subsystem L1 cache), the second memory component is an in-memory data store, the third component is a structured database, and the fourth memory component is a vector database. In other words, the L1 memory cache equivalent stores transient context elements of the contextual data, the L2 memory cache equivalent stores short-lived context elements of the contextual data, the L3 memory cache equivalent stores persistent data of the contextual data, the L4 memory cache equivalent stores vector representations of contextual data, or a combination thereof.

In one embodiment, the size of information between all the cache levels can be specified. For example, there can be discrete quanta of data varying in size depending on the environment and task. These quanta are specific sizes between L2 and L1, specific sizes between L3 and L2, etc. In one embodiment, the system can refer to the packets of information between caches as Sentence (L2 to L1), Page (L3 to L2), and Book (L4 to L2/L3) to reflect the relative difference in information packet sizes. Additionally, a specific quantized size may not even be required by a memory size/amount number (e.g., MB), the quantization could be a higher level abstraction such as an idea. Where one "Sentence" can hold an idea, one "Page" can hold primary, and secondary info on a topic, etc. Basically a conventional process has a defined bit width to which it can process, the architecture of the various embodiments described herein does not require a defined bit width, but can operate at a higher level abstraction of ideas. In one embodiment, the system can use a neural network or equivalent ML system that can be used to determine the effectiveness of the quanta or "Sentence" or "Page" or "book" based on semantic understanding.

Accordingly, in one embodiment, the system can further comprise a memory controller component configured to quantize packets of information into one or more discrete sizes based on the AI computing environment, a task being performed by the AI computing environment, or a combination thereof. By way of example, the one or more discrete sizes are defined between the L2 memory cache equivalent and L1 memory cache equivalent, between the L3 memory cache equivalent and L2 memory cache equivalent, between the L4 memory cache equivalent and the L3 memory cache equivalent, between the L4 memory cache equivalent and the L2 memory cache equivalent, or a combination thereof. The one or more discrete sizes is specified based on memory size, based on a size abstraction, or a combination thereof.

As previously discussed, the AI computing environment comprises one or more AI models assigned to operate across one or more levels of the L1 memory cache equivalent, the L2 memory cache equivalent, the L3 memory cache equivalent, the L4 memory cache equivalent, or a combination thereof. The AI computing environment comprises a plurality of processors respectively executing the one or more AI models as sub-tasks. In this way, the L1 memory cache equivalent, the L2 memory cache equivalent, the L3 memory cache equivalent, the L4 memory cache equivalent, or a combination thereof store contextual data for augmenting one or more inputs to the one or more AI models (e.g., as illustrated in FIGS. 2A-2F).

Figure 4A:
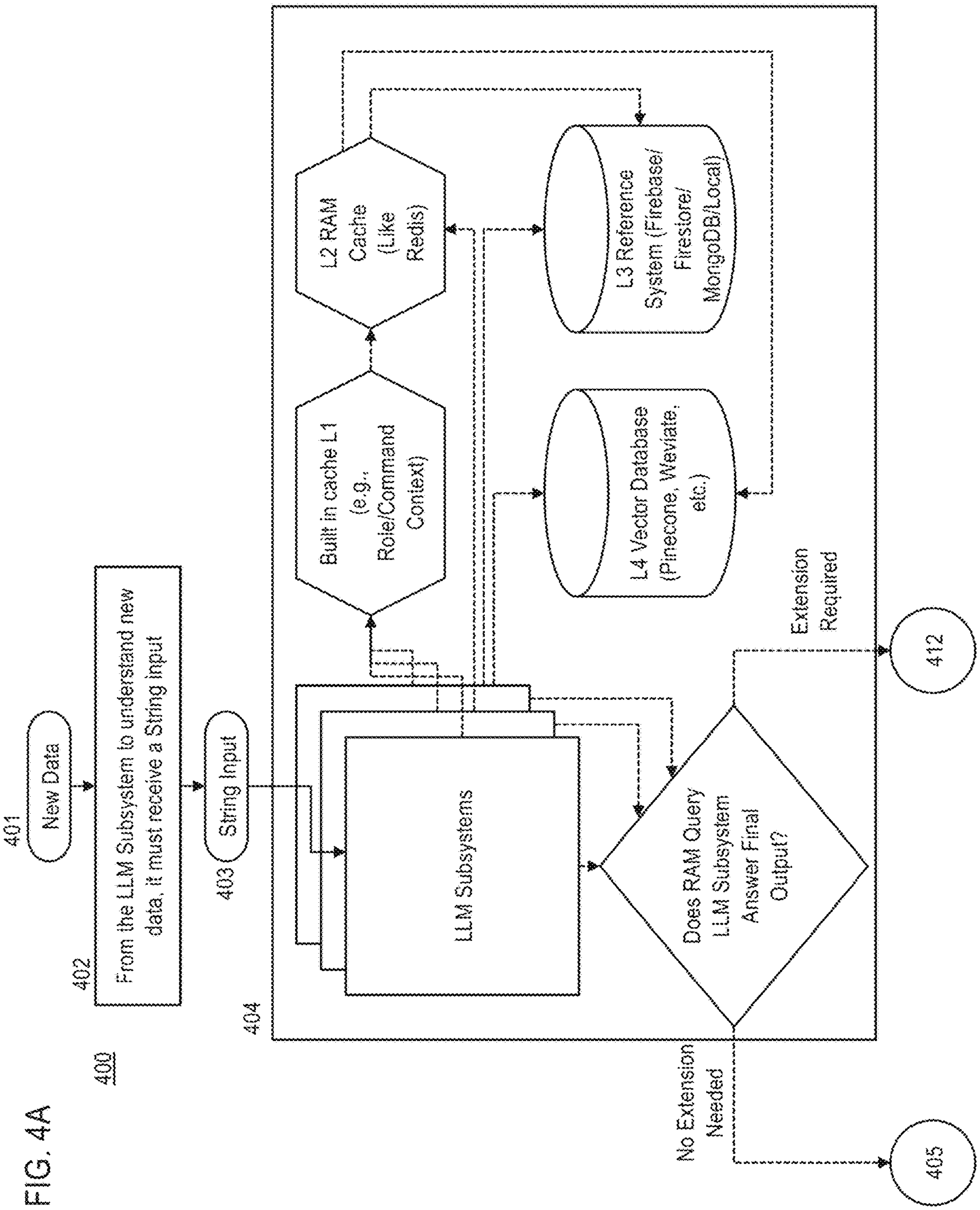
FIGS. 4A and 4B are diagrams of an immersive dialogue loop system, according to one embodiment.
Figure 4B:
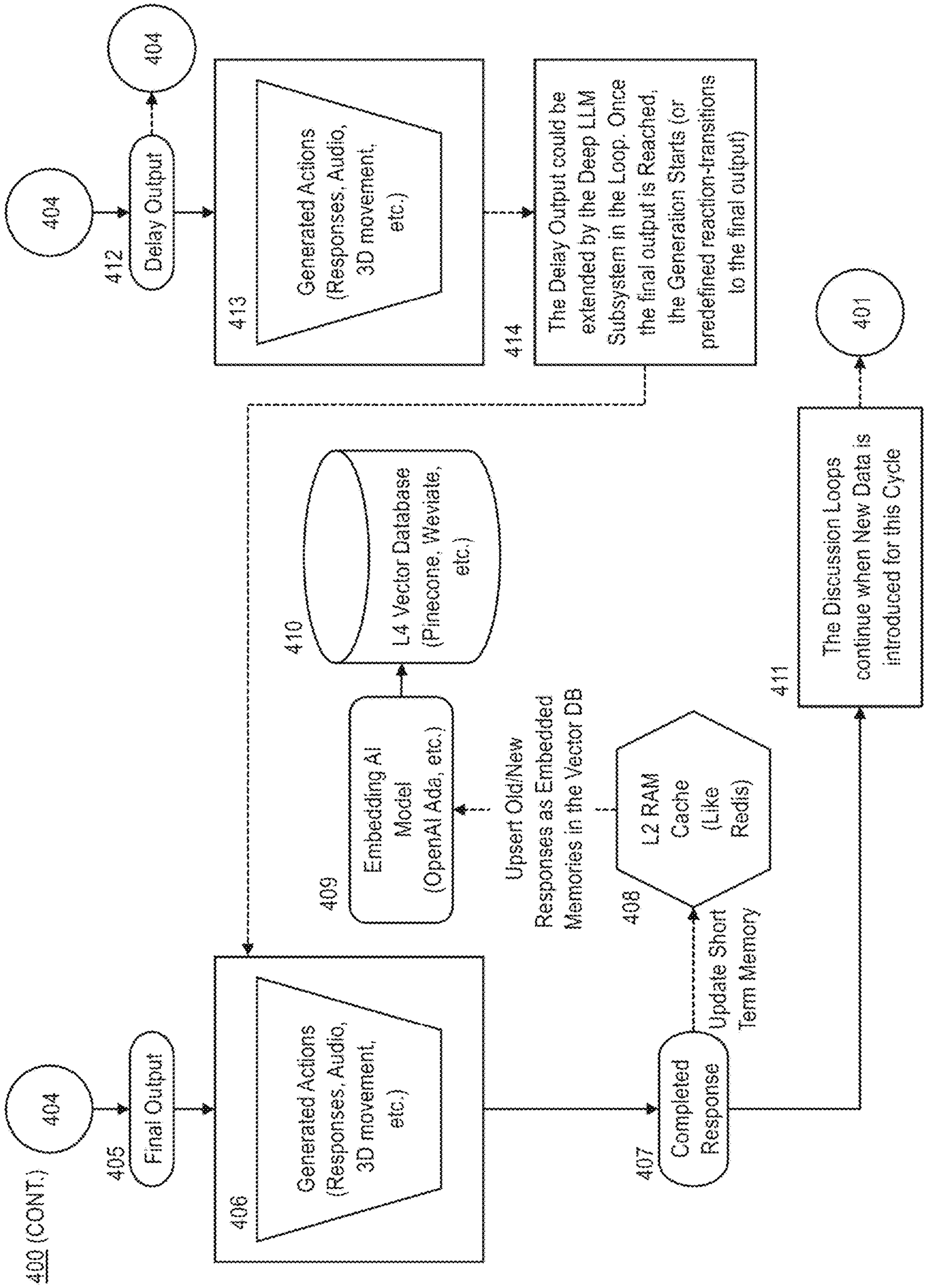

FIGS. 4A and 4B are diagrams of an immersive dialogue loop system, according to one embodiment. In one example, the system and/or any of its components/circuitry may perform one or more portions of a process 400 and may be implemented in/by various means, for instance, one or more chip sets including a processor and a memory as shown in FIGS. 5-7 or in a circuitry, hardware, firmware, software, or in any combination thereof. As such, the system and/or any associated component, apparatus, device, circuitry, system, computer program product, method, and/or non-transitory computer readable medium, or any combination thereof, can provide means for accomplishing various parts of the process 400, as well as means for accomplishing embodiments of other processes described herein. Although the process 400 is illustrated and described as a sequence of steps, it is contemplated that various embodiments of the process 400 may be performed in any order or combination and need not include all of the illustrated steps.

In one embodiment, the process 400 of FIGS. 4A and 4B illustrate the intricate yet streamlined process of an AI's dialogue loop, aiming to maintain a user's immersion even when there's a necessity for delay sequences. The figure seamlessly integrates multiple subsystems, a testament to the complexity of the AI's decision-making process.

The steps of the process 400 are illustrated as follows.

1. Data Acquisition:

At process 401, the system begins by receiving new data (e.g., as described with respect to the various embodiments of FIGS. 2A-2G).

At process 402, ensuring seamless processing, this data undergoes conversion or preparation to become a string type (e.g., also as described with respect to the various embodiments of FIGS. 2A-2G).

2. Initial Processing:

At process 403, this string input is earmarked for the LLM Subsystem.

At process 404, the LLM subsystems, a multi-pronged AI, spring into action. They process the string input and face a decision: whether to quickly generate a final response or issue a delay for deeper contextual evaluation. The decision is aided by context from the L1 cache and recent inputs stored in the L2 cache. If necessary, deeper memory systems L3 and L4 might come into play.

3. Immediate Response Pathway:

At process 405, if a final response is determined immediately, the system proceeds along this trajectory:

At process 406, the system gets creative, molding the final response to be delivered via Text-to-Speech (TTS), 3D animations, sound effects, or other immersive methods.

At process 407, the shaped response is finalized as a string type.

At process 408, for future reference and contextual richness, this interaction (response-to-input) gets logged in the short-term memory, or the L2 cache.

At process 409, using advanced embedding models, the logged chat is enriched with semantic context, increasing the intelligence of future responses.

At process 410, for long-term retrieval and even deeper context, the information is stored in the L4 vector database.

At process 411, once stored, the system is ready and waiting for the next interaction, or another loop of this intricate process.

4. Extended Contextual Evaluation:

At process 412, If the system decides a deeper dive is necessary, it signals a delay, steering the process back towards the LLM subsystem to tap into the deeper wells of context from L2, L3, or even L4 data.

At process 413, every delay is a calculated decision. When Alpha or Beta models seek more time, they initiate predefined immersive experiences, like audio clips or 3D animations. For example, an AI could exhibit a 'pondering' animation, enhancing the realism of its interaction. If the Omega model hits a knowledge roadblock, it'll gracefully express its need for more context.

At process 414, these immersive 'distractions' are not only to bide time but to also ensure a seamless transition back to the AI's dynamically generated response, ensuring the AI or NPC retains its 'character' throughout. This fine balance between immersion and delay is vital, especially when dealing with intricacies like audio generation. In other words, in one embodiment, the system further comprises a gaming component configured to provide one or more distraction experiences during one or more processing delays of the AI computing environment.

By way of example, the components and circuitry described herein communicate with each other and other components of the communication network using well known, new or still developing protocols. In this context, a protocol includes a set of rules defining how the network nodes within the communication network interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a datalink (layer 2) header, an internetwork (layer 3) header and a transport (layer 4) header, and various application headers (layer 5, layer 6 and layer 7) as defined by the OSI Reference Model.

The processes described herein for providing Adaptive Semantic Interaction System (ASIS) for Contextual NPC Engagement and Content Management in Video Game Environments may be advantageously implemented via circuitry, software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

FIG. 5 illustrates a computer system 500 upon which an embodiment of the invention may be implemented. Computer system 500 is programmed (e.g., via computer program code or instructions) to provide Adaptive Semantic Interaction System (ASIS) for Contextual NPC Engagement and Content Management in Video Game Environments as described herein and includes a communication mechanism such as a bus 510 for passing information between other internal and external components of the computer system 500. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 510 includes one or more parallel conductors of information so that information is transferred quickly among devices coupled to the bus 510. One or more processors 502 for processing information are coupled with the bus 510.

A processor 502 performs a set of operations on information as specified by computer program code related to providing Adaptive Semantic Interaction System (ASIS) for Contextual NPC Engagement and Content Management in Video Game Environments. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 510 and placing information on the bus 510. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 502, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 500 also includes a memory 504 coupled to bus 510. The memory 504, such as a random access memory (RAM) or other dynamic storage device, stores information including processor instructions for providing Adaptive Semantic Interaction System (ASIS) for Contextual NPC Engagement and Content Management in Video Game Environments. Dynamic memory allows information stored therein to be changed by the computer system 500. RAM allows a unit of information stored at a location called a memory address to be stored and retrieved independently of information at neighboring addresses. The memory 504 is also used by the processor 502 to store temporary values during execution of processor instructions. The computer system 500 also includes a read only memory (ROM) 506 or other static storage device coupled to the bus 510 for storing static information, including instructions, that is not changed by the computer system 500. Some memory is composed of volatile storage that loses the information stored thereon when power is lost. Also coupled to bus 510 is a non-volatile (persistent) storage device 508, such as a magnetic disk, optical disk or flash card, for storing information, including instructions, that persists even when the computer system 500 is turned off or otherwise loses power.

Information, including instructions for providing Adaptive Semantic Interaction System (ASIS) for Contextual NPC Engagement and Content Management in Video Game Environments, is provided to the bus 510 for use by the processor from an external input device 512, such as a keyboard containing alphanumeric keys operated by a human user, or a sensor. A sensor detects conditions in its vicinity and transforms those detections into physical expression compatible with the measurable phenomenon used to represent information in computer system 500. Other external devices coupled to bus 510, used primarily for interacting with humans, include a display device 514, such as a cathode ray tube (CRT) or a liquid crystal display (LCD), or plasma screen or printer for presenting text or images, and a pointing device 516, such as a mouse or a trackball or cursor direction keys, or motion sensor, for controlling a position of a small cursor image presented on the display 514 and issuing commands associated with graphical elements presented on the display 514. In some embodiments, for example, in embodiments in which the computer system 500 performs all functions automatically without human input, one or more of external input device 512, display device 514 and pointing device 516 is omitted.

In the illustrated embodiment, special purpose hardware, such as an application specific integrated circuit (ASIC) 520, is coupled to bus 510. The special purpose hardware is configured to perform operations not performed by processor 502 quickly enough for special purposes. Examples of application specific ICs include graphics accelerator cards for generating images for display 514, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 500 also includes one or more instances of a communications interface 570 coupled to bus 510. Communication interface 570 provides a one-way or two-way communication coupling to a variety of external devices that operate with their own processors, such as printers, scanners and external disks. In general, the coupling is with a network link 578 that is connected to a local network 580 to which a variety of external devices with their own processors are connected. For example, communication interface 570 may be a parallel port or a serial port or a universal serial bus (USB) port on a personal computer. In some embodiments, communications interface 570 is an integrated services digital network (ISDN) card or a digital subscriber line (DSL) card or a telephone modem that provides an information communication connection to a corresponding type of telephone line. In some embodiments, a communication interface 570 is a cable modem that converts signals on bus 510 into signals for a communication connection over a coaxial cable or into optical signals for a communication connection over a fiber optic cable. As another example, communications interface 570 may be a local area network (LAN) card to provide a data communication connection to a compatible LAN, such as Ethernet.

Wireless links may also be implemented. For wireless links, the communications interface 570 sends or receives or both sends and receives electrical, acoustic or electromagnetic signals, including infrared and optical signals, that carry information streams, such as digital data. For example, in wireless handheld devices, such as mobile telephones like cell phones, the communications interface 570 includes a radio band electromagnetic transmitter and receiver called a radio transceiver. In certain embodiments, the communications interface 570 enables connection to the communication network for providing Adaptive Semantic Interaction System (ASIS) for Contextual NPC Engagement and Content Management in Video Game Environments.

The term computer-readable medium is used herein to refer to any medium that participates in providing information to processor 502, including instructions for execution. Such a medium may take many forms, including, but not limited to, non-volatile media, volatile media and transmission media. Non-volatile media include, for example, optical or magnetic disks, such as storage device 508. Volatile media include, for example, dynamic memory 504. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Network link 578 typically provides information communication using transmission media through one or more networks to other devices that use or process the information. For example, network link 578 may provide a connection through local network 580 to a host computer 582 or to equipment 584 operated by an Internet Service Provider (ISP). ISP equipment 584 in turn provides data communication services through the public, worldwide packet-switching communication network of networks now commonly referred to as the Internet 590.

A computer called a server host 592 connected to the Internet hosts a process that provides a service in response to information received over the Internet. For example, server host 592 hosts a process that provides information representing video data for presentation at display 514. It is contemplated that the components of system can be deployed in various configurations within other computer systems, e.g., host 582 and server 592.

FIG. 6 illustrates a chip set 600 upon which an embodiment of the invention may be implemented. Chip set 600 is programmed to provide Adaptive Semantic Interaction System (ASIS) for Contextual NPC Engagement and Content Management in Video Game Environments as described herein and includes, for instance, the processor and memory components described with respect to FIG. 5 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 600 includes a communication mechanism such as a bus 601 for passing information among the components of the chip set 600. A processor 603 has connectivity to the bus 601 to execute instructions and process information stored in, for example, a memory 605. The processor 603 may include one or more processing cores with each core configured to perform independently. A multi-core processor enables multiprocessing within a single physical package. Examples of a multi-core processor include two, four, eight, or greater numbers of processing cores. Alternatively or in addition, the processor 603 may include one or more microprocessors configured in tandem via the bus 601 to enable independent execution of instructions, pipelining, and multithreading. The processor 603 may also be accompanied with one or more specialized components to perform certain processing functions and tasks such as one or more digital signal processors (DSP) 607, or one or more application-specific integrated circuits (ASIC) 609. A DSP 607 typically is configured to process real-world signals (e.g., sound) in real time independently of the processor 603. Similarly, an ASIC 609 can be configured to perform specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 603 and accompanying components have connectivity to the memory 605 via the bus 601. The memory 605 includes both dynamic memory (e.g., RAM, magnetic disk, writable optical disk, etc.) and static memory (e.g., ROM, CD-ROM, etc.) for storing executable instructions that when executed perform the inventive steps described herein to provide Adaptive Semantic Interaction System (ASIS) for Contextual NPC Engagement and Content Management in Video Game Environments. The memory 605 also stores the data associated with or generated by the execution of the inventive steps.

FIG. 7 is a diagram of exemplary components of a mobile terminal (e.g., handset) capable of operating in the system of FIG. 1, according to one embodiment. Generally, a radio receiver is often defined in terms of front-end and back-end characteristics. The front end of the receiver encompasses all of the Radio Frequency (RF) circuitry whereas the back end encompasses all of the base-band processing circuitry. Pertinent internal components of the telephone include a Main Control Unit (MCU) 703, a Digital Signal Processor (DSP) 705, and a receiver/transmitter unit including a microphone gain control unit and a speaker gain control unit. A main display unit 707 provides a display to the user in support of various applications and mobile station functions that offer automatic contact matching. An audio function circuitry 709 includes a microphone 711 and microphone amplifier that amplifies the speech signal output from the microphone 711. The amplified speech signal output from the microphone 711 is fed to a coder/decoder (CODEC) 713.

A radio section 715 amplifies power and converts frequency in order to communicate with a base station, which is included in a mobile communication system, via antenna 717. The power amplifier (PA) 719 and the transmitter/modulation circuitry are operationally responsive to the MCU 703, with an output from the PA 719 coupled to the duplexer 721 or circulator or antenna switch, as known in the art. The PA 719 also couples to a battery interface and power control unit 720.

In use, a user of mobile station 701 speaks into the microphone 711 and his or her voice along with any detected background noise is converted into an analog voltage. The analog voltage is then converted into a digital signal through the Analog to Digital Converter (ADC) 723. The control unit 703 routes the digital signal into the DSP 705 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, 5G New Radio networks, code division multiple access (CDMA), wireless fidelity (WiFi), satellite, and the like.

The encoded signals are then routed to an equalizer 725 for compensation of any frequency-dependent impairments that occur during transmission though the air such as phase and amplitude distortion. After equalizing the bit stream, the modulator 727 combines the signal with an RF signal generated in the RF interface 729. The modulator 727 generates a sine wave by way of frequency or phase modulation. In order to prepare the signal for transmission, an up-converter 731 combines the sine wave output from the modulator 727 with another sine wave generated by a synthesizer 733 to achieve the desired frequency of transmission. The signal is then sent through a PA 719 to increase the signal to an appropriate power level. In practical systems, the PA 719 acts as a variable gain amplifier whose gain is controlled by the DSP 705 from information received from a network base station. The signal is then filtered within the duplexer 721 and optionally sent to an antenna coupler 735 to match impedances to provide maximum power transfer. Finally, the signal is transmitted via antenna 717 to a local base station. An automatic gain control (AGC) can be supplied to control the gain of the final stages of the receiver. The signals may be forwarded from there to a remote telephone which may be another cellular telephone, another mobile phone or a landline connected to a Public Switched Telephone Network (PSTN), or other telephony networks.

Voice signals transmitted to the mobile station 701 are received via antenna 717 and immediately amplified by a low noise amplifier (LNA) 737. A down-converter 739 lowers the carrier frequency while the demodulator 741 strips away the RF leaving only a digital bit stream. The signal then goes through the equalizer 725 and is processed by the DSP 705. A Digital to Analog Converter (DAC) 743 converts the signal and the resulting output is transmitted to the user through the speaker 745, all under control of a Main Control Unit (MCU) 703—which can be implemented as a Central Processing Unit (CPU) (not shown).

The MCU 703 receives various signals including input signals from the keyboard 747. The keyboard 747 and/or the MCU 703 in combination with other user input components (e.g., the microphone 711) comprise a user interface circuitry for managing user input. The MCU 703 runs a user interface software to facilitate user control of at least some functions of the mobile station 701 to provide Adaptive Semantic Interaction System (ASIS) for Contextual NPC Engagement and Content Management in Video Game Environments. The MCU 703 also delivers a display command and a switch command to the display 707 and to the speech output switching controller, respectively. Further, the MCU 703 exchanges information with the DSP 705 and can access an optionally incorporated SIM card 749 and a memory 751. In addition, the MCU 703 executes various control functions required of the station. The DSP 705 may, depending upon the implementation, perform any of a variety of conventional digital processing functions on the voice signals. Additionally, DSP 705 determines the background noise level of the local environment from the signals detected by microphone 711 and sets the gain of microphone 711 to a level selected to compensate for the natural tendency of the user of the mobile station 701.

The CODEC 713 includes the ADC 723 and DAC 743. The memory 751 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 751 may be, but not limited to, a single memory, CD, DVD, ROM, RAM, EEPROM, optical storage, or any other non-volatile or non-transitory storage medium capable of storing digital data.

An optionally incorporated SIM card 749 carries, for instance, important information, such as the cellular phone number, the carrier supplying service, subscription details, and security information. The SIM card 749 serves primarily to identify the mobile station 701 on a radio network. The card 749 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A system for data storage in an artificial intelligence (AI) computing environment comprising:

a first memory component configured as a first-level (L1) memory cache equivalent to store first data that is transient;

a second memory component configured as a second-level (L2) memory cache equivalent to store second data that is not held within the in-memory data store and is accessed at greater than an L2 frequency threshold;

a third memory component configured as a third-level (L3) memory cache equivalent to store third data that is accessed at less than the L2 frequency threshold and at greater than an L3 frequency threshold; and a fourth memory component configured as a fourth-level (L4) memory cache equivalent to store fourth data that is accessed at less than the L3 frequency threshold, wherein the first memory component is an AI model cache, the second memory component is an in-memory data store, the third component is a structured database, and the fourth memory component is a vector database.

2. The system of claim 1, wherein the vector database employs one or more algorithms for discerning one or more patterns, one or more trends, one or more relationships, or a combination thereof in the fourth data stored in the vector database.

3. The system of claim 1, further comprising:

a memory controller component configured to quantize packets of information into one or more discrete sizes based on the AI computing environment, a task being performed by the AI computing environment, or a combination thereof.

4. The system of claim 3, wherein the one or more discrete sizes are defined between the L2 memory cache equivalent and L1 memory cache equivalent, between the L3 memory cache equivalent and L2 memory cache equivalent, between the L4 memory cache equivalent and the L3 memory cache equivalent, between the L4 memory cache equivalent and the L2 memory cache equivalent, or a combination thereof.

5. The system of claim 4, wherein the one or more discrete sizes is specified based on memory size, based on a size abstraction, or a combination thereof.

6. The system of claim 1, wherein the AI computing environment comprises one or more AI models assigned to operate across one or more levels of the L1 memory cache equivalent, the L2 memory cache equivalent, the L3 memory cache equivalent, the L4 memory cache equivalent, or a combination thereof.

7. The system of claim 6, wherein the AI computing environment comprises a plurality of processors respectively executing the one or more AI models as sub-tasks.

8. The system of claim 1, wherein the L1 memory cache equivalent, the L2 memory cache equivalent, the L3 memory cache equivalent, the L4 memory cache equivalent, or a combination thereof store contextual data for augmenting one or more inputs to the one or more AI models.

9. The system of claim 8, wherein the L1 memory cache equivalent stores transient context elements of the contextual data, the L2 memory cache equivalent stores short-lived context elements of the contextual data, the L3 memory cache equivalent stores persistent data of the contextual data, the L4 memory cache equivalent stores vector representations of contextual data, or a combination thereof.

10. The system of claim 1, further comprising:

a data component configured to receive one or more data types, and to convert the one or more data types to one or more string-based representations for storage in the L1 memory cache equivalent, the L2 memory cache equivalent, the L3 memory cache equivalent, the L4 memory cache equivalent, or a combination thereof.

11. The system of claim 1, further comprising:

one or more Large Language Model (LLM) subsystems configured to process the first data, second data, the third data, the fourth data, or a combination thereof to generate an output response.

12. The system of claim 11, wherein the output response relates to one or more character interactions in a dialogue loop system of a video game environment.

13. The system of claim 12, further comprising:

a gaming component configured to provide one or more distraction experiences during one or more processing delays of the AI computing environment.

14. A method for data storage in an artificial intelligence (AI) computing environment comprising:

configuring a first memory component configured as a first-level (L1) memory cache equivalent to store first data that is transient;

configuring a second memory component as a second-level (L2) memory cache equivalent to store second data that is not held within the in-memory data store and is accessed at greater than an L2 frequency threshold;

configuring a third memory component as a third-level (L3) memory cache equivalent to store third data that is accessed at less than the L2 frequency threshold and at greater than an L3 frequency threshold; and configuring a fourth memory component as a fourth-level (L4) memory cache equivalent to store fourth data that is accessed at less than the L3 frequency threshold, wherein the first memory component is an AI model cache, the second memory component is an in-memory data store, the third component is a structured database, and the fourth memory component is a vector database.

15. The method of claim 14, further comprising:

quantizing packets of information into one or more discrete sizes based on the AI computing environment, a task being performed by the AI computing environment, or a combination thereof.

16. An apparatus for data storage in an artificial intelligence (AI) computing environment comprising:

at least one processor; and at least one memory storing instructions that, when executed by the at least one processor, cause the apparatus at least to perform:

configure a first memory component configured as a first-level (L1) memory cache equivalent to store first data that is transient;

configure a second memory component as a second-level (L2) memory cache equivalent to store second data that is not held within the in-memory data store and is accessed at greater than an L2 frequency threshold;

configure a third memory component as a third-level (L3) memory cache equivalent to store third data that is accessed at less than the L2 frequency threshold and at greater than an L3 frequency threshold; and configure a fourth memory component as a fourth-level (L4) memory cache equivalent to store fourth data that is accessed at less than the L3 frequency threshold, wherein the first memory component is an AI model cache, the second memory component is an in-memory data store, the third component is a structured database, and the fourth memory component is a vector database.

17. The apparatus of claim 16, wherein the apparatus is further caused to:

quantize packets of information into one or more discrete sizes based on the AI computing environment, a task being performed by the AI computing environment, or a combination thereof.

* * * * *